US012383871B2

(12) United States Patent
Yoder et al.

(10) Patent No.: US 12,383,871 B2
(45) Date of Patent: Aug. 12, 2025

(54) STRUCTURES HAVING RE-ENTRANT GEOMETRIES ON A POROUS MATERIAL SURFACE

(71) Applicant: Donaldson Company, Inc., Bloomington, MN (US)

(72) Inventors: Mikayla A. Yoder, Eagan, MN (US); Christopher P. Conklin, Columbia, MD (US); Davis B. Moravec, Burnsville, MN (US); Andrew J. Dallas, Lakeville, MN (US); Tianheng Zhao, Cambridge (GB); Richard W. Janse van Rensburg, Great Cambourne (GB); Peter Jackson, Royston (GB); Blane Scott, Cambridge (GB)

(73) Assignee: Donaldson Company, Inc., Bloomington, MN (US)

( * ) Notice: Subject to any disclaimer, the term of this patent is extended or adjusted under 35 U.S.C. 154(b) by 455 days.

(21) Appl. No.: 17/825,761

(22) Filed: May 26, 2022

(65) Prior Publication Data
US 2022/0379268 A1    Dec. 1, 2022

Related U.S. Application Data

(60) Provisional application No. 63/193,807, filed on May 27, 2021.

(51) Int. Cl.
*B01D 69/12*    (2006.01)
*B01D 69/02*    (2006.01)
*B01D 71/52*    (2006.01)

(52) U.S. Cl.
CPC ............ *B01D 69/12* (2013.01); *B01D 69/02* (2013.01); *B01D 71/52* (2013.01);
(Continued)

(58) Field of Classification Search
CPC combination set(s) only.
See application file for complete search history.

(56) References Cited

U.S. PATENT DOCUMENTS 4,316,772 A * 2/1982 Cheng ................ B01D 69/1216
                                          210/500.21
4,419,242 A * 12/1983 Cheng .................... B01D 69/12
                                          210/500.37
(Continued)

FOREIGN PATENT DOCUMENTS

DE    102006036863 B4 * 10/2008 ......... B01D 67/0034
DE    102020209732 A1     2/2022
(Continued)

OTHER PUBLICATIONS

Ahn et al., "Large-Area Roll-to-Roll and Roll-to-Plate Nanoimprint Lithography: A Step toward High-Throughput Application of Continuous Nanoimprinting," ACS Nano, Jul. 2, 2009, vol. 3, No. 8, pp. 2304-2310.
(Continued)

*Primary Examiner* — Jennifer Dieterle
*Assistant Examiner* — Sonji Turner
(74) *Attorney, Agent, or Firm* — Mueting Raasch Group

(57) ABSTRACT

A filter material has a layer of porous material and a plurality of structures disposed on a surface of the layer, where each of the structures has a re-entrant geometry. The plurality of structures may be a plurality of ordered structures. A filter material may include a layer of porous material and a plurality of re-entrant structures disposed on a surface of the layer, each of the re-entrant structures including a stem and a cap, where the caps of adjacent structures are attached to each other to form a plurality of pores, where each pore is disposed between adjacent re-entrant structures.

10 Claims, 25 Drawing Sheets

(52) U.S. Cl.
CPC ...... *B01D 2325/02* (2013.01); *B01D 2325/08* (2013.01); *B01D 2325/38* (2013.01)

(56) References Cited

U.S. PATENT DOCUMENTS

| | | | |
|---|---|---|---|
| 6,218,000 B1* | 4/2001 | Rudolf | B01D 67/0027 428/338 |
| 7,445,742 B2 | 11/2008 | Chen et al. | |
| 7,998,559 B2 | 8/2011 | Krupenkin et al. | |
| 8,088,445 B2* | 1/2012 | Thottupurathu | B01D 71/36 427/372.2 |
| 8,529,774 B2 | 9/2013 | Krupenkin et al. | |
| 8,808,848 B2* | 8/2014 | Bacino | B32B 3/26 428/319.3 |
| 8,858,681 B2 | 10/2014 | Harp | |
| 8,870,345 B2 | 10/2014 | Zhang et al. | |
| 9,108,880 B2 | 8/2015 | Jin et al. | |
| 9,308,501 B2* | 4/2016 | Hu | B01D 71/32 |
| 9,475,105 B2 | 10/2016 | Sigmund et al. | |
| 9,873,622 B2* | 1/2018 | Kang | B01D 71/0281 |
| 9,956,743 B2 | 5/2018 | Jin et al. | |
| 10,124,300 B2* | 11/2018 | Solomon | B01D 17/085 |
| 10,202,711 B2 | 2/2019 | Tuteja et al. | |
| 10,220,351 B2 | 3/2019 | Tuteja et al. | |
| 10,369,525 B2 | 8/2019 | Ding et al. | |
| 10,391,530 B2 | 8/2019 | Kim et al. | |
| 2002/0004107 A1* | 1/2002 | Rogers | B01D 39/1692 442/40 |
| 2008/0257153 A1 | 10/2008 | Harp | |
| 2013/0108845 A1* | 5/2013 | Tee | B01D 71/36 428/206 |
| 2013/0144217 A1 | 6/2013 | Ross | |
| 2015/0075989 A1* | 3/2015 | Solomon | C02F 1/4696 210/641 |
| 2015/0238908 A1 | 8/2015 | Ding et al. | |
| 2016/0207083 A1* | 7/2016 | Kim | B05D 5/08 |
| 2016/0214069 A1 | 7/2016 | Ding et al. | |
| 2016/0339625 A1 | 11/2016 | Mead et al. | |
| 2017/0158831 A1 | 6/2017 | Sigmund et al. | |
| 2017/0203255 A1 | 7/2017 | Mundrigi et al. | |
| 2018/0016136 A1 | 1/2018 | Xu et al. | |
| 2018/0178167 A1 | 6/2018 | de Lannoy et al. | |
| 2018/0178249 A1 | 6/2018 | Ma et al. | |
| 2018/0328918 A1 | 11/2018 | Drebing et al. | |
| 2018/0333679 A1 | 11/2018 | Puglia | |
| 2021/0086143 A1* | 3/2021 | Mishra | B01D 71/0213 |

FOREIGN PATENT DOCUMENTS

| | | |
|---|---|---|
| EP | 2583733 A1 | 4/2013 |
| EP | 3726947 A1 | 10/2020 |
| JP | 2015000371 A | 1/2015 |
| WO | 2015048504 A2 | 4/2015 |
| WO | 2018085376 A2 | 5/2018 |
| WO | 2019075898 A1 | 4/2019 |
| WO | 2022212900 A1 | 10/2022 |
| WO | 2022251488 A1 | 12/2022 |

OTHER PUBLICATIONS

Brown et al., "Durable, superoleophobic polymernanoparticle composite surfaces with re-entrant geometry via solvent-induced phase transformation," Scientific Reports, Feb. 15, 2016, vol. 6, No. 21048, pp. 1-11.
He et al., "Multiple Equilibrium Droplet Shapes and Design Criterion for Rough Hydrophobic Surfaces," Langmuir, 2003, vol. 19, pp. 4999-5003.
Hutfles et al., "Roll-to-roll nanoimprint lithography of ultrafiltration membrane," Journal of Applied Polymer Science, 2018, vol. 45993, pp. 1-12.
International Preliminary Report on Patentability in PCT/US2022/023143, mailed Oct. 3, 2023, 9 pages.
International Preliminary Report on Patentability in PCT/US2022/031119, mailed Nov. 21, 2023, 8 pages.
International Search Report and Written Opinion in PCT/US2022/023143, mailed Jul. 12, 2022, 13 pages.
International Search Report and Written Opinion in PCT/US2022/031119, mailed Aug. 26, 2022, 11 pages.
Jucius et al., "Hot embossing of PTFE: Towards superhydrophobic surfaces," Applied Surface Science, 2011, vol. 257, pp. 2353-2360.
Patankar, Neelesh A., "On the Modeling of Hydrophobic Contact Angles on Rough Surfaces," Langmuir, 2003, vol. 19, pp. 1249-1253.
Shivaprakash et al., "Continuous manufacturing of reentrant structures via roll-to-roll process," Journal of Applied Polymer Science, 2019, vol. 46980, pp. 1-8.
Tuteja et al., "Designing Superoleophobic Surfaces," Science, Dec. 7, 2007, vol. 318, pp. 1618-1622.
Tuteja et al., "Robust omniphobic surfaces," PNAS, Nov. 25, 2008, vol. 105, No. 47, pp. 18200-18205.
U.S. Appl. No. 63/067,053, filed Aug. 18, 2020, 32 pages.
U.S. Appl. No. 63/145,084, filed Feb. 3, 2021, 93 pages.
U.S. Appl. No. 63/170,104, filed Apr. 2, 2021, 57 pages.
Velten et al., "Roll-to-Roll Hot Embossing of Microstructures," Microsystem Technologies, 2010, vol. 17, pp. 619-627.
Zhu et al., "Well-defined porous membranes for robust omniphobic surfaces via microfluidic emulsion templating," Nature Communications, Jun. 12, 2017, vol. 8, No. 15823, pp. 1-10.

* cited by examiner

| | Geometry 1 | Geometry 2 | Geometry 3 | Geometry 4 | Geometry 5 | Geometry 6 | Geometry 7 | Geometry 8 | Geometry 9 |
|---|---|---|---|---|---|---|---|---|---|
| Stem Height (μm) | 30 | 1 | 30 | 30 | 30 | 30 | 30 | 30 | 30 |
| Cap Height (μm) | 1 | 1 | 10 | 1 | 1 | 1 | 1 | 1 | 1 |
| Stem Radius (μm) | 10 | 10 | 10 | 20 | 10 | 10 | 10 | 10 | 10 |
| Inner Radius (μm) | 10 | 10 | 10 | 10 | 20 | 10 | 10 | 10 | 10 |
| Outer Radius (μm) | 10 | 10 | 10 | 10 | 10 | 20 | 10 | 10 | 10 |
| Hoodoo Angle (°) | 90 | 90 | 90 | 90 | 90 | 90 | 30 | 90 | 90 |
| Edge Spacing, x-direction (μm) | 50 | 50 | 50 | 50 | 50 | 50 | 50 | 200 | 200 |
| Edge Spacing, y-direction (μm) | 50 | 50 | 50 | 50 | 50 | 50 | 50 | 50 | 200 |
| Breakthrough Pressure (Pa) | 353 | 353 | 353 | 379 | 397 | 252 | 314 | 157 | 74 |

FIG. 8

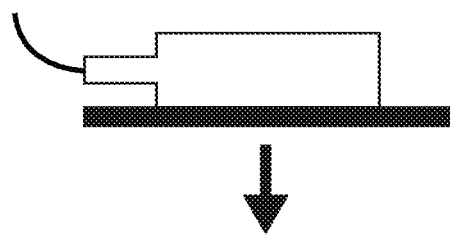
FIG. 28
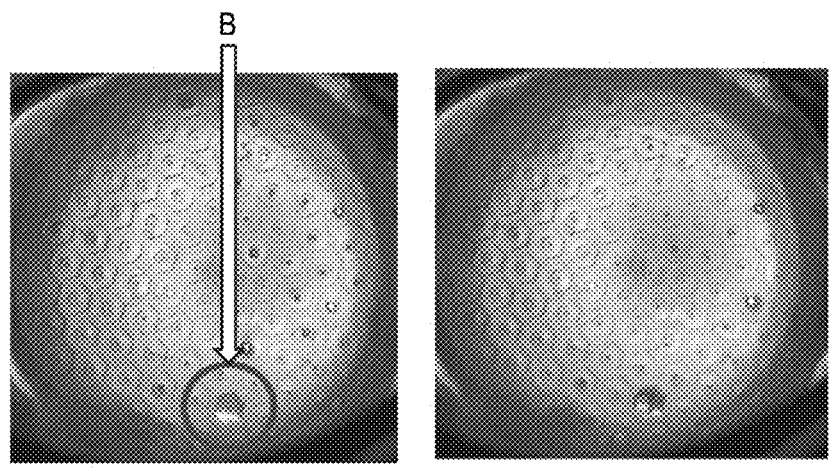
FIG. 29A    FIG. 29B
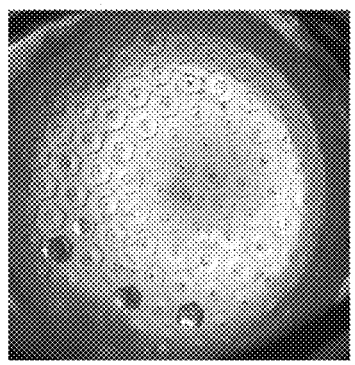  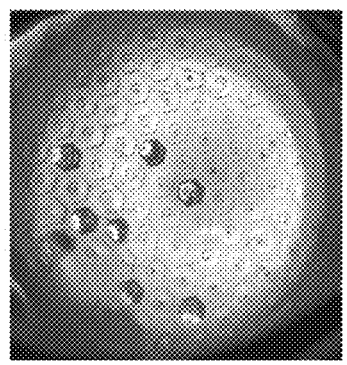  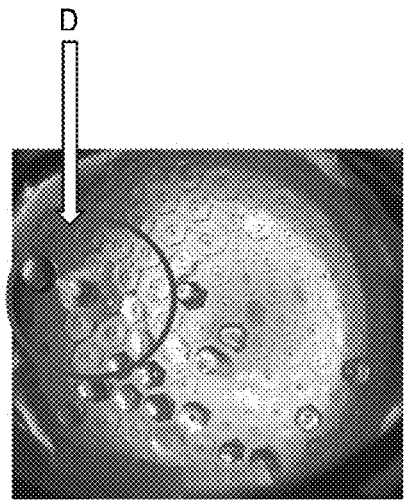
FIG. 29C    FIG. 29D    FIG. 29E

STRUCTURES HAVING RE-ENTRANT GEOMETRIES ON A POROUS MATERIAL SURFACE

RELATED APPLICATIONS

This application claims the benefit of U.S. Provisional Application No. 63/193,807, filed 27 May 2021, the disclosure of which is incorporated by reference herein in its entirety.

TECHNICAL FIELD

This disclosure relates generally to a plurality of structures having re-entrant geometries disposed on one or more surfaces of a porous material to increase the hydrophobicity and/or oleophobicity of the material and methods of forming the same.

BACKGROUND

In some filtration applications it may be desirable to prevent wetting and contamination of filter media by a liquid. Depending on the application, the liquid may be an aqueous liquid or an oil-based liquid. Repellency to aqueous liquids (e.g., hydrophobicity) may be achieved by coating the filter media with a fluorinated polymer. However, achieving repellency without fluorinated chemicals is desirable for environmental reasons. Further, achieving repellency to oil-based liquids (e.g., oleophobicity) may be desirable in some cases.

SUMMARY

Embodiments described herein are directed to a filter material. The filter material comprises a layer of porous material and a plurality of structures disposed on a surface of the layer. The structures have a re-entrant geometry. Other embodiments are directed to a filter element comprising this filter material.

Further embodiments are directed to a filter material comprising a layer of porous material and a plurality of hoodoo structures disposed on a surface of the layer. Each of the hoodoo structures comprises a stem and a cap and the caps of adjacent structures are attached to form a plurality of pores, where each pore is disposed between adjacent hoodoo structures. Other embodiments are directed to a filter element comprising this filter material.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

FIG. 8 is a chart illustrating various dimensions for nine hoodoo geometries and corresponding calculated breakthrough pressures, in accordance with certain embodiments;

FIG. 28 is a schematic side view of a sample test arrangement, in accordance with certain embodiments; and FIGS. 29A-29E are microscopic images of a sample with a continuous lattice with re-entrant hoodoo structures and drainage channels, being tested with the sample test arrangement of FIG. 28.

DEFINITIONS

Figure 1A:
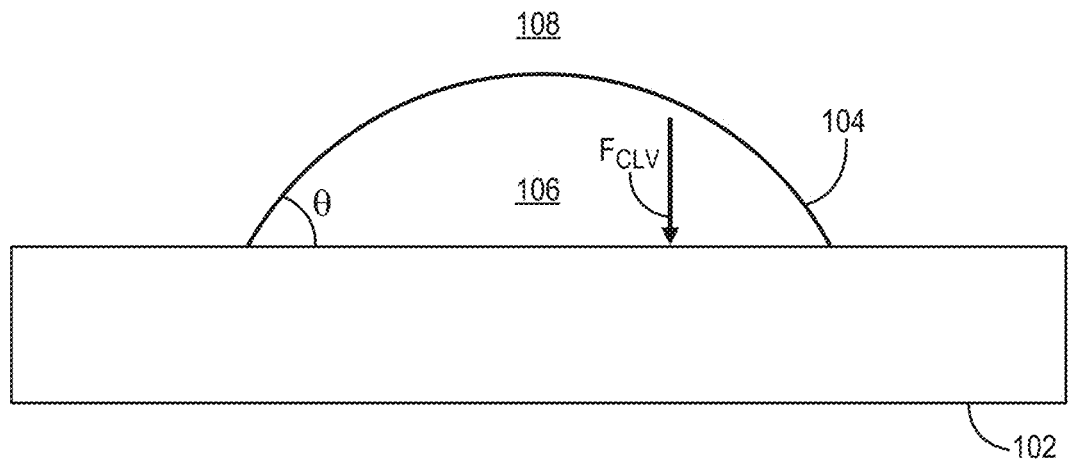
FIG. 1A is a schematic diagram illustrating the vertical contact line force of a droplet on a flat surface.

All headings provided herein are for the convenience of the reader and should not be used to limit the meaning of any text that follows the heading, unless so specified.

Terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" (if used) means one or all of the listed elements or a combination of any two or more of the listed elements. Further, "e.g." is used as an abbreviation for the Latin phrase exempli gratia and means "for example."

The use of numerical ranges by endpoints includes all numbers within that range (e.g., 1 to 5 includes 1, 1.5, 2, 2.75, 3, 3.80, 4, and 5) and any range within that range. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The term "about" is used here in conjunction with numeric values to include normal variations in measurements as expected by persons skilled in the art, and is understood have the same meaning as "approximately" and to cover a typical margin of error, such as ±5% of the stated value.

Relative terms such as proximal, distal, left, right, forward, rearward, top, bottom, side, upper, lower, horizontal, vertical, and the like may be used in this disclosure to simplify the description. However, such relative terms do not limit the scope of the invention in any way. Terms such as left, right, forward, rearward, top, bottom, side, upper, lower, horizontal, vertical, and the like are from the perspective observed in the particular figure.

Any direction referred to herein, such as "top," "bottom," "left," "right," "upper," "lower," and other directions or orientations are described herein for clarity and brevity but are not intended to be limiting of an actual device or system. Devices and systems described herein may be used in a number of directions and orientations.

As used here, "have," "having," "include," "including," "comprise," "comprising," or the like are used in their open-ended sense, and generally mean "including, but not limited to." It will be understood that "consisting essentially of," "consisting of," and the like are subsumed in "comprising" and the like. As used herein, "consisting essentially of," as it relates to a composition, product, method, or the like, means that the components of the composition, product, method, or the like are limited to the enumerated components and any other components that do not materially affect the basic and novel characteristic(s) of the composition, product, method, or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

The term "substantially" as used here has the same meaning as "significantly," and can be understood to modify the term that follows by at least about 90%, at least about 95%, or at least about 98%. The term "not substantially" as used here has the same meaning as "not significantly," and can be understood to have the inverse meaning of "substantially," i.e., modifying the term that follows by not more than 10%, not more than 5%, or not more than 2%.

DETAILED DESCRIPTION

The present disclosure generally relates to a plurality of structures having re-entrant geometries disposed on one or more surfaces of a porous material. Such structures may be utilized to selectively increase the liquid-phobicity (e.g., hydrophobicity or oleophobicity) of the material. The present disclosure also relates to methods of making such materials and structures.

In some cases, it may be desirable to provide a porous material with capability to resist contamination or to repel contamination by liquids. For example, it may be desirable for a porous material (such as a venting media or a filter media) to repel liquids (such as polar liquids, e.g., water-based liquids, or non-polar liquids). Thus, depending on the intended use, a "contaminant" may be water or a water-based (aqueous) liquid or another polar liquid, or a non-polar liquid, such as an oil-based or organic-solvent based liquid.

Generally, porous materials can provide a spectrum of liquid repellency properties ranging from non-repelling (i.e., liquid-philic) to repelling (i.e., liquid-phobic) and very repelling (i.e., super-phobic). The degree of repellency can be determined by measuring a contact angle for the liquid with respect to the porous material. The contact angle is the angle measured through a liquid droplet where a liquid-vapor interface meets a solid surface. Liquid-phobic (e.g., hydrophobic and oleophobic) materials are defined as materials with a contact angle greater than 90°, and superhydrophobic materials have a contact angle greater than 150°. The liquid repellency of a porous surface is dictated by both the surface chemistry (surface energy) and surface structure. Embodiments described herein are directed to modifying a porous material's repellency by modifying the material's surface structure.

Patterning a surface of a porous material with a plurality of specified structures can increase the repellency of the material. For example, a wetting material, such as a liquid-philic porous material could be made liquid-phobic by disposing a plurality of ordered structures on a surface of the material. In other examples, a hydrophobic porous material may be made oleophobic by disposing a plurality of structures on a surface of the material. This may be done by reducing, or avoiding, the use of coatings, and particularly by avoiding the use of coatings involving fluorine, such as environmentally unfriendly bio-persistent chemical coatings. While applying a predefined pattern to a porous material can improve hydrophobicity and oleophobicity, these repelling properties can be improved when the resulting surface involves a plurality of structures each having a re-entrant geometry.

A re-entrant structure is any structure that when a straight line is drawn through a portion of the structure, the line will cross through at least two interfaces of the structure. The re-entrancy may be defined relative to a plane. That is, a structure may be re-entrant relative to a horizontal plane (e.g., the plane of the substrate), where a line perpendicular to the horizontal plane (i.e., a vertical line), crosses through at least two interfaces of the structure. Re-entrant structures may be referred to as having re-entrant geometry. A structure may also be multiply re-entrant. For example, a structure may be double re-entrant. In a double re-entrant structure, a first line (e.g., a vertical line) drawn through a portion of the structure will cross through two interfaces of the structure, and there exists at least one second line, perpendicular to the first line, drawn through a portion of the structure that will cross through at least four interfaces of the structure.

Hoodoos are a subcategory of re-entrant structures. A hoodoo generally has a stem-and-cap construction, where the cap is wider than the stem. Hoodoos are further discussed below with regard to, for example, FIGS. 2C and 5A-5E.

Figure 1B:
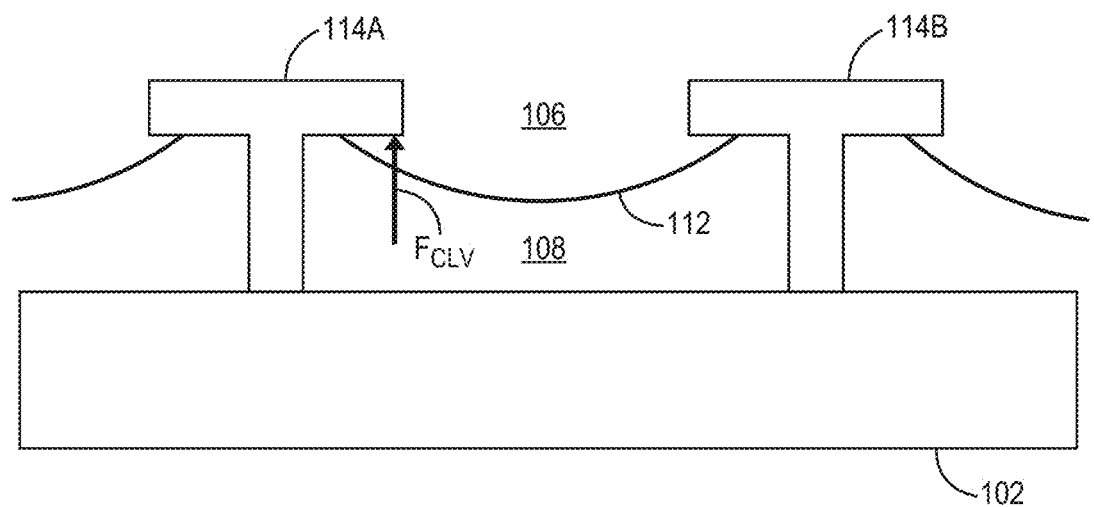
FIG. 1B is a schematic diagram illustrating the vertical contact line force of droplets on a plurality of structures having a re-entrant geometry, in accordance with certain embodiments.

A re-entrant structure may cause a meniscus of a liquid (e.g., droplet) to invert as a liquid wets into the material including the re-entrant structures. An inverted meniscus may reduce, minimize, or prevent the liquid from wetting through to the underlying surface. Similarly, a re-entrant structure with a double re-entrant geometry has the above properties of a re-entrant geometry along with an overhang portion where the contact line of a liquid interface moves in a vertical direction on the overhang portion of the structure as the contact line moves along the surface. The inversion of a meniscus is illustrated in FIGS. 1A and 1B. In FIG. 1A, a liquid droplet 106 is disposed in a gaseous environment 108 on a substantially flat surface of a substrate 102. The droplet adheres to the surface of the substrate 102, and the droplet's 106 meniscus 104 curves outward, away from the substrate's 102 surface, such that the vertical component, $F_{CLV}$, of the contact line force, $F_{CL}$ is directed toward, or into, the substrate 102. The liquid has a contact angle θ on the substrate 102. If the substrate 102 is a porous material, the droplet 106 may wet into and possibly occlude and clog any pores covered by the droplet 106. In FIG. 1B, a plurality of structures 114A, 114B having a re-entrant geometry is disposed on the surface of the substrate 102. Here, the liquid droplet 106 adheres to the structures 114A, 114B and the meniscus 112 is inverted as compared with the meniscus 104. The inversion leaves a pocket of gas 108 between the droplet 106 and the surface of the substrate 102 between the structures 114A, 114B. This may be particularly desirable when the substrate 102 is a porous material, to maintain the porosity of the substrate 102. The vertical component of the contact line force, indicated by arrow 116, is also inverted to be directed away from substrate 102. The vertical component, $F_{CLV}$, of the contact line force, $F_{CL}$ is directed toward, or into, the structures 114A, 114B.

Figure 1C:
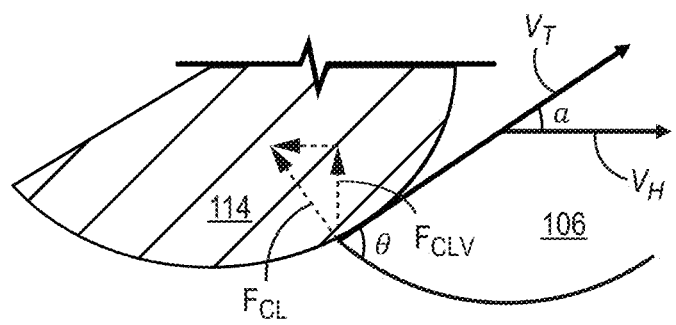
FIG. 1C is a diagram illustrating contact line force in accordance with certain embodiments.

The vertical component, $F_{CLV}$, of the contact line force, $F_{CL}$, is described by Equation 1:

$$F_{CLV} = \gamma_{LG} l \sqrt{\overline{\sin(\theta_{equilibrium} - \alpha)}} \qquad \text{Equation 1}$$

where $\gamma_{LG}$ is the surface tension between the liquid and gas, l is the length of the contact line, $\theta_{equilibrium}$ is the contact angle at equilibrium described by Young's equation ($\gamma_{SG} = \gamma_{SL} + \gamma_{LG} \cos \theta_{equilibrium}$, where S=solid, L=liquid, and G=gas) for a flat non-porous surface, and α is the angle the solid boundary makes with the horizontal plane, and the overbar represents that the sine function is averaged over all points in the contact line. The contact line is a continuous line at the interface of the liquid (e.g., droplet), the solid surface (e.g., surface of the re-entrant structure), and the surrounding environment (e.g., air). When the forces affecting the liquid are at equilibrium, the contact line is pinned to the surface at a set of pinning points. At equilibrium, the contact line can be thought of as a continuous line that connects the pinning points along the perimeter of a droplet. The contact line force $F_{CL}$ and an inverted meniscus of a droplet 106 are further illustrated in FIG. 1C, also showing the tangent vector $v_T$ at a pinning location on the solid surface 114 and illustrating the angle a of the solid boundary with the horizontal plane (parallel to horizontal vector $v_H$).

Certain re-entrant geometries can be used to invert a droplet's meniscus. Such geometries are discussed further below.

Figure 2A:
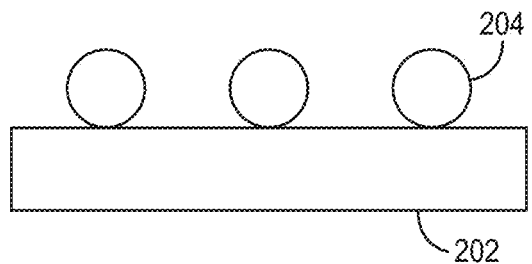
FIG. 2A is a cross-sectional view of a sphere re-entrant geometry, in accordance with certain embodiments.
Figure 2B:
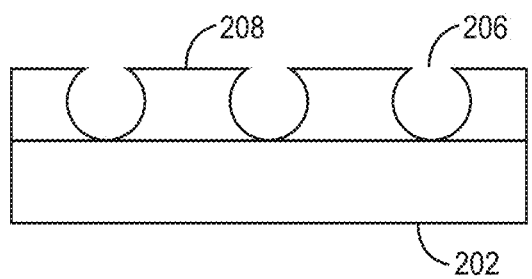
FIG. 2B is a cross-sectional view of an inverse sphere re-entrant geometry, in accordance with certain embodiments.
Figure 2C:
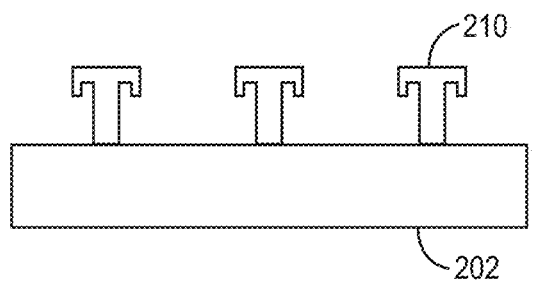
FIG. 2C is a cross-sectional view of a hoodoo re-entrant geometry, in accordance with certain embodiments.

FIGS. 2A-2C illustrate examples of various re-entrant structures that may be applied to a surface of a porous material. The re-entrant structures may have any suitable shape, size, pattern, and distance from each other (e.g., lattice pitch), as further discussed below. In some embodiments, the re-entrant structures may be applied in an ordered pattern. FIG. 2A illustrates a cross-section of a sphere geometry where the structures of a pattern are regularly spaced spheres 204 disposed on the surface of a porous material substrate 202. FIG. 2B illustrates a cross-section of an inverse sphere geometry where the structures 208 form a sphere-shaped void 206 among adjacent structures 208 on the surface of a porous material substrate 202. While the structures in FIGS. 2A and 2B are shown as spheres (e.g., structure or void with a radius of a single length), the structures may also be modified to form three-dimensional ovals of various dimensions (e.g., structure or void having at least two radii of different lengths) or other shapes modified from a sphere. FIG. 2C illustrates cross-sections of re-entrant structures 210 having a hoodoo geometry, disposed on the surface of a porous material substrate 202. The curved surfaces and overhanging configurations of each of these three geometries allow for the meniscus of a liquid to be flipped or inverted. An inverted meniscus may reduce, minimize, or prevent the liquid from wetting through to the underlying surface of the substrate 202.

A simple force balance equation may be used to explain when, and why, a liquid is repelled or when the liquid will wet through the re-entrant structures. As long as the vertical component of the contact line force ($F_{CLV}$) is greater than the vertical component of the external force on the droplet (e.g., externally applied pressure, including gravity) into the pore of the re-entrant geometry ($F_{IN}$), the droplet is repelled. When the external vertical force ($F_{IN}$) on the droplet into the pore of the re-entrant geometry overcomes the vertical component of the contact line force pointing out of the structure, the liquid will wet through the structure. This may be represented as Equations 2 and 3:

$$F_{CLV} < F_{IN} \text{ wetting} \qquad \text{Equation 2}$$

$$F_{CLV} \geq F_{IN} \text{ repellency(no wetting)} \qquad \text{Equation 3.}$$

According to an embodiment, the re-entrant structures are applied to one or more surfaces of a porous material. Two different types of pores may be distinguished when discussing re-entrant structures disposed on a porous substrate. That is, the pores formed by or between the re-entrant structures, and the inherent pores of the porous substrate itself. In this disclosure, any discussion of pores refers to the pores formed by or between the re-entrant structures, unless otherwise stated.

Figure 3A:
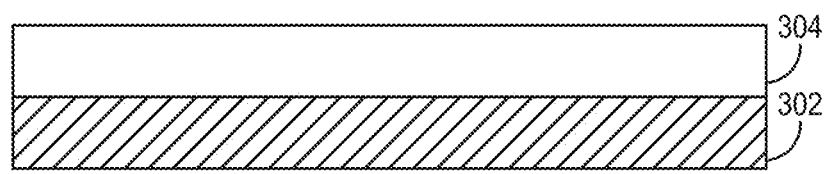
FIG. 3A is a cross-sectional view of a porous material with a re-entrant layer on one surface, in accordance with certain embodiments.
Figure 3B:
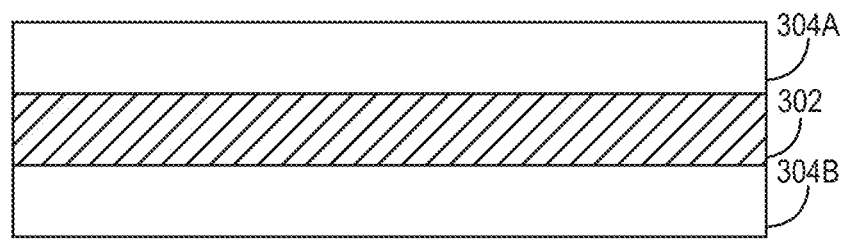
FIG. 3B is a cross-sectional view of a porous material with a re-entrant layer on opposing surfaces, in accordance with certain embodiments.

Depending upon the application of the porous material, a plurality of re-entrant structures may be applied to a first side of a layer as in FIG. 3A, or to two or more sides, as in FIG. 3B. In certain applications, a first plurality of re-entrant structures is disposed on a first side, and a second plurality of re-entrant structures is disposed on a second, opposing side of the same layer of porous material, as shown in FIG. 3B. FIGS. 3A and 3B illustrate composite, or multi-layer, materials where a structured, or re-entrant, layer 304, 304A, 304B is coupled with an underlying porous material layer 302. By providing the re-entrant layer to an underlying porous material layer, the re-entrant structures can be incorporated without losing permeability of the underlying porous material, and the original specifications of the porous material with respect to permeability and liquid (e.g., water) entry pressure and particle efficiency can be substantially maintained for a particular application.

In FIG. 3A, a first layer 302 of porous material is provided. A second layer 304 of material including a plurality of re-entrant structures having one or more re-entrant geometries is disposed on and/or coupled to the first layer 302 to form a dual-layer composite material. The re-entrant structures provide advantages discussed herein with respect to repellency. The re-entrant structures may be formed on the second layer 304 prior to coupling the layers to form the composite material, or after the first layer 302 and second layer 304 are affixed to each other. The first layer 302 is a porous material that can be designed to satisfy air flow and/or liquid (e.g., water) entry pressure specifications needed for a desired use (e.g., venting or filtration) and could be used as-is, without modification. The second, re-entrant layer 304 is designed for one or more expected contaminants in the desired use to reduce the wettability of the composite material and reduce, or minimize, contact angle hysteresis (i.e., release). Without the second, re-entrant layer 304 of material, the porous material may not release contaminants and liquid may clog the pores of the substrate, decreasing air flow and venting ability. The second, re-entrant layer 304 can also be a porous material, either the same material as the first layer 302, or a different type of porous material. In certain embodiments, the second, re-entrant material may comprise at least one of polymeric fibers, metal meshes, expanded polytetrafluoroethylene, laser etched material, colloids or other inorganic/hard particles, or another polymer material.

The composite material can be formed by laminating the two material layers together or be combined in any variety of ways. While the composite material is described as a dual layer material, a porous material may support re-entrant structures on opposing surfaces either directly on one or more surfaces of the porous material or on one or more material layers coupled to the surface(s) of a porous material. Techniques for forming these structured surfaces are described below. For example, the re-entrant structures may be formed to include, or not include, a residual thickness of the second layer 304 between the bottom of the structures and the upper surface of the first layer 302.

The composite material may also include any variety of combinations of materials. For example, in certain embodiments a re-entrant layer may be of the same material as the porous material or different material than the porous material. When two re-entrant layers are present, the re-entrant layers may be of the same material or of different materials, and one, both, or neither may be of the same material as the porous material layer. For example, the porous material layer may comprise at least one of polypropylene, polyethylene, polyester, polyethersulfone, polysulfone, expanded polytetrafluoroethylene, polyvinylidene fluoride, polyamide, polyacrylonitrile, polycarbonate, cellulose acetate, and nylon. The re-entrant layer 304 may be a solid (i.e., nonporous) material. The re-entrant layer 304 may include metals, thermoplastic polymers (e.g., acrylic, polytetrafluoroethylene, polyethersulfone, polypropylene, polyethylene, polyethylene terephthalate, polycarbonate, polyamide, polymethyl methacrylate, etc.), thermoset polymers (e.g., epoxies, acrylates, urethanes, thiols, etc.), ceramics, or combinations thereof. If two or more re-entrant layers are present, the materials of the two or more layers may be independently selected. The materials for a re-entrant layer may be selected to provide a predetermined amount of flexibility. The materials for the re-entrant layer(s) may include a coating that increases the oleophobicity of the layer, such as a silicone-based, parylene, acrylic, wax-based, or a fluorochemical coating. In some embodiments, the material is free of fluorochemical coatings.

In certain embodiments, materials for the re-entrant material layer 304 may include a porous material. One example of a suitable porous material is expanded polytetrafluoroethylene. In further embodiments, the layer may be coupled with an unstructured layer of expanded polytetrafluoroethylene. Certain materials having an open structure that has aligned nodes to provide higher permeability may be structured as re-entrant layer 304. Examples of such open structure materials are described in co-pending application entitled Patterned Porous Material Surfaces, filed as U.S. Provisional Patent Application No. 63/170,104 on Apr. 2, 2021. The material used to prepare the re-entrant material layer may be designed to be compressible. Preferably, to avoid needing a very open initial pore structure prior to applying or forming structures, the material is not so compressible as to collapse the pore structure. A material that generally has a high air flow and good compressibility could be structured as layer 304. In certain embodiments a material with many nodes and fibrils could be used to compress the nodes to create the structures of layer 304 to avoid loss of permeability by avoiding compressing the fibrils/pores. Alternative materials may include laser etched media to create re-entrant structures, singed polyester or other polymers to create re-entrant structures, laminate nonwoven materials, aperture films, and aligned electrospun fibers. Depending on the wetting of the contaminant (e.g., $\theta<90°$), the re-entrant layer 304 may include re-entrant structures of a variety of shapes and dimensions as discussed herein. The orientation of the structures of the layer 304 may be designed to provide repellency for expected liquid contaminants as described herein. The re-entrant and substrate materials as well as the surface tension of the expected contaminant may contribute to the design considerations.

One design consideration for the layer of re-entrant structures is the lattice pitch (center-to-center spacing) among the re-entrant structures. In certain embodiments, the re-entrant structures are disposed as a plurality of ordered structures. As used herein, "ordered" refers to a plurality of re-entrant structures having a regular, predefined, and at least partly uniform lattice pitch between adjacent re-entrant structures. Thus, the ordered structures are not disposed randomly on the surface of the porous material. However, the predefined lattice pitch may differ in different directions among the structures or in different regions of the surface. For example, structures may have a first lattice pitch in the x-direction along a planar surface and a second, different lattice pitch in the y-direction along the planar surface. In further embodiments, the structures may not necessarily be disposed as ordered structures, such as when the structures form a continuous re-entrant structure which is discussed further below.

In certain embodiments, a plurality of ordered structures form a pattern on a material surface. While a pattern may be an array of re-entrant structures with consistent lattice pitch, a pattern could also involve different shaped re-entrant structures, a plurality of shapes, varying lattice pitches and/or an unequal number of structures in rows and/or columns. In alternative embodiments, patterns may take complex shapes which include complex combinations of the re-entrant structures. The pattern shapes may be regular or irregular.

Figure 4:
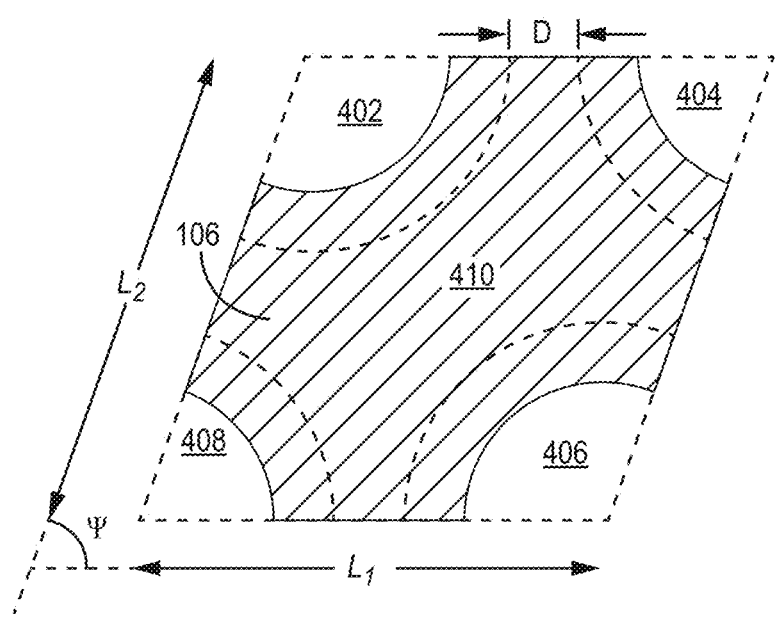
FIG. 4 is a top down perspective view of spacing among structures having a re-entrant geometry, in accordance with certain embodiments.

The lattice pitch of a plurality of ordered re-entrant structures, in accordance with various embodiments, is illustrated in FIG. 4. FIG. 4 shows a top-view of portions of a subset of four re-entrant structures (e.g., hoodoo structures) 402, 404, 406, and 408. Each of the re-entrant structures 402, 404, 406, and 408 is disposed adjacent each other such that they define an area 410 between the structures 402, 404, 406, and 408. A liquid droplet 106 is shown as being supported, or repelled, by re-entrant structures 402, 404, 406, and 408. The lattice pitch is the distance between the centers of two adjacent re-entrant structures (i.e., the center-to-center spacing). The lattice pitch of the structures 402, 404, 406, and 408 is defined by a first lattice length $L_1$ between structures 408 and 406 (e.g., in the x direction) and a second lattice length $L_2$ between structures 408 and 402 (e.g., in the y direction). As set forth above, the first and second lattice lengths may be substantially the same, or they may be different. The lattice lengths may also be oriented with respect to each other at various angles shown by the lattice angle, $\psi$, the angle between lattice lengths $L_1$ and $L_2$. The parallelogram formed by $L_i$, $L_2$, $\psi$ is called a unit cell. A different measured dimension is edge spacing, which is the distance D between the outermost edges of two adjacent re-entrant structures (i.e., edge-to-edge spacing).

The lattice pitch of the ordered structures is one parameter that controls the repellency of the ordered structures. The maximum lattice pitch to maintain repellency for certain re-entrant structures may be determined using Equation 4:

$$P_{wet} = \frac{F_{CLV}}{A}, \quad \text{Equation 4}$$

where $P_{wet}$ is the wetting pressure (herein also referred to as "breakthrough pressure") into the plurality of structures, $F_{CLV}$ is the vertical component of the contact line force (calculated with Equation 1 above), and A is the projected surface area of a meniscus among a plurality of structures, which can be computed from Equation 5:

$$A = L_1 L_2 \sin \psi - A_{unwetted} \quad \text{Equation 5}$$

where $A_{unwetted}$ is the area of the unit cell not covered by the projected surface area of the meniscus. If the contact line on each structure is identical and circular, for example, $A_{unwetted}$ relates to the contact line length/according to $A_{unwetted} = l^2/4\pi$. The lattice pitch provided by this equation is the maximum spacing to achieve a desired repellency. However, two or more structures in the pattern may have a lattice pitch less than the calculated value.

The breakthrough pressure is the pressure on a liquid droplet that causes the droplet to wet through the re-entrant structures to the underlying porous material. This occurs when the contact lines, shown in FIG. 4 as positioned above the edges of the re-entrant structures, move along the re-entrant structures to the underlying porous material or the liquid otherwise reaches the underlying porous material. Using Equation 4, it can be seen that the smaller the edge spacing or lattice pitch, the smaller the area (A) and the larger resulting breakthrough pressure for a given plurality of ordered re-entrant structures. In reverse, a greater lattice pitch and area A will result in a smaller breakthrough pressure needed to wet the material.

The critical points of the re-entrant structure are defined as the points where the angle $\alpha$ from Equation 1 is minimized. If repellency is possible, the pinning points will always be at or between the critical points and the outermost edges of the re-entrant structure, since for every point further from the edge than the critical point there is a point closer to the edge than the critical point with the same angle $\alpha$—meaning the two points will have the same force $F_{CL}$ but the point closer to the edge will produce a higher repellant pressure due to a reduced meniscus area (A). Therefore the coordinates of the re-entrant structure from the critical point to the outermost edge, the lattice pitches and lattice angle, and the surface tension and contact angle are the properties that affect the breakthrough pressure.

Additionally, the permeability of the re-entrant layer may be affected by the solid fraction of the re-entrant layer. Solid fraction of the layer may be determined by the equation shown below as Equation 6:

$$\phi_s = \frac{Area_{solid}}{L_1 L_2 \sin\psi} \quad \text{Equation 6}$$

where $\phi_s$ is the solid fraction of the re-entrant layer surface, $Area_{solid}$ is the projected surface area of the re-entrant layer that is solid (excluding the pores) within the unit cell $L_1 L_2 \sin \psi$, $L_1$ and $L_2$ are the two lattice lengths, and $\psi$ is the relative angle between them. Generally for the re-entrant layer, a lower solid fraction provides better (higher) permeability but with a tradeoff in mechanical robustness of the re-entrant structures.

Using these equations to predetermine the re-entrant structure's disposition on the porous material provides control over the repellency of a material with respect to an expected contaminant. A well-designed re-entrant structure, or plurality of structures, provides good release properties (i.e., roll-off angle) for expected contaminants.

Each of the above equations applies to re-entrant structures of any re-entrant geometries.

Figure 5A:
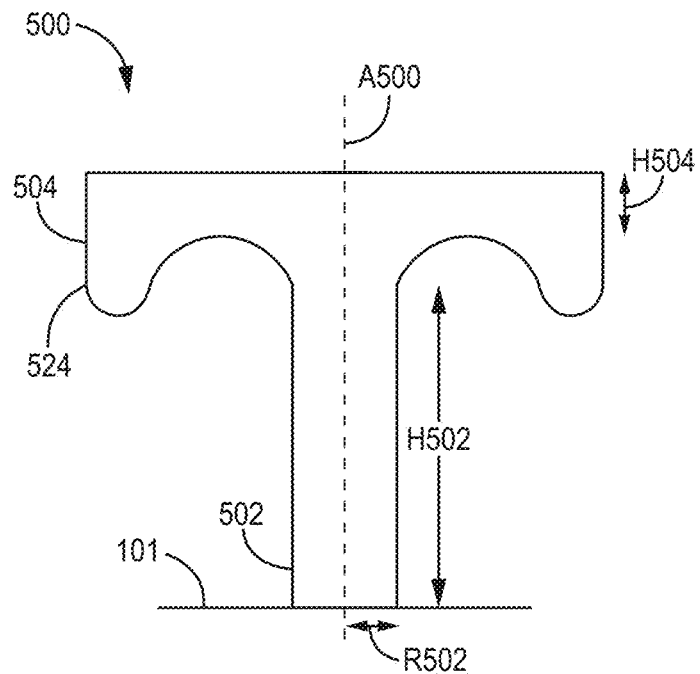
FIG. 5A is a cross-sectional view of a structure having a hoodoo geometry showing various dimensions, in accordance with certain embodiments.
Figure 5B:
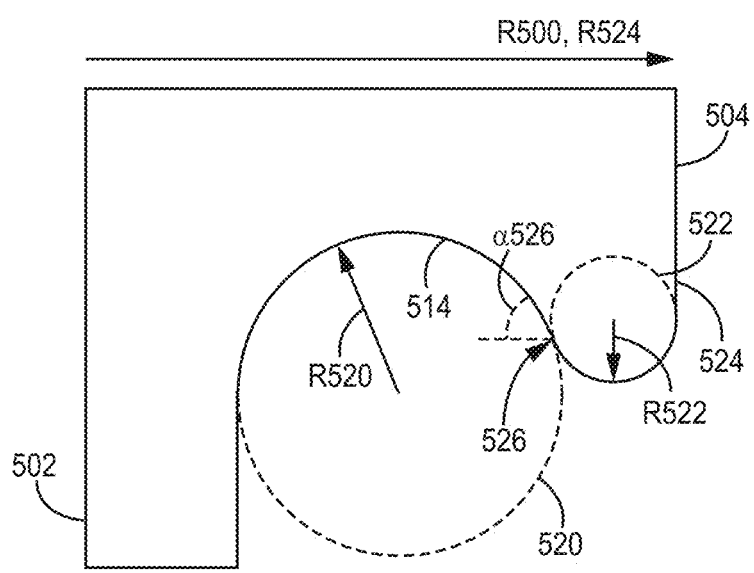
FIG. 5B is a cross-sectional view of half of a double re-entrant hoodoo structure showing various dimensions, in accordance with certain embodiments.
Figure 5C:
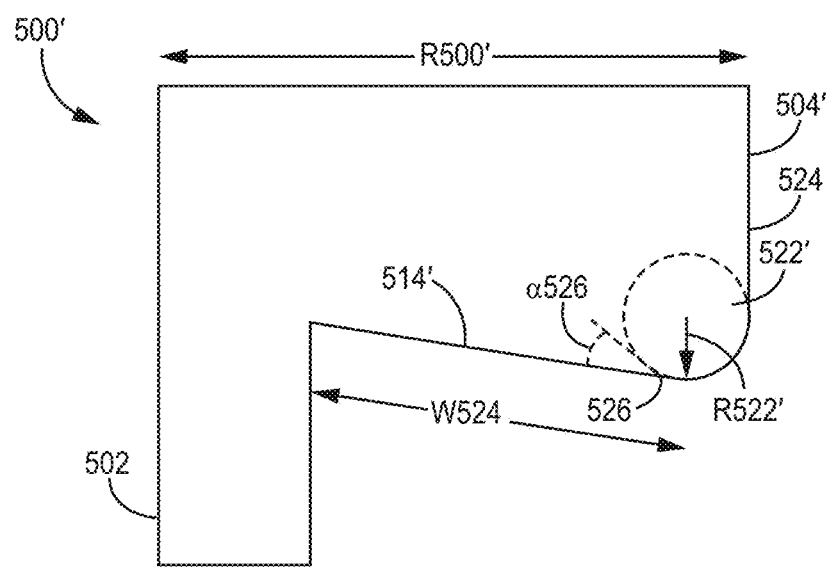
FIG. 5C is a cross-sectional view of half of a single re-entrant hoodoo structure showing various dimensions, in accordance with certain embodiments.

FIGS. 5A-C illustrate cross-sectional views of re-entrant structure shaped as a hoodoo 500, according to an embodiment, and various dimensions thereof. The hoodoo 500 includes a stem 502 extending from a surface 101, and a cap 504 extending from the stem 502. The cap 504 may include a lip or overhang 524 extending from the perimeter of the cap 504 downward toward the surface 101. The hoodoo 500 defines a longitudinal axis A500. The axis A500 may be perpendicular to the surface 101. The hoodoo 500 may be defined by several parameters including stem height H502, stem radius R502, cap height H504, inner radius R520, outer radius R522, and hoodoo angle α526. FIG. 5A illustrates a cross-section of a hoodoo that includes a stem 502 and a cap 504 with an overhang 524. These hoodoos 500 may be disposed on a surface 101 as a plurality of ordered structures having one or more lattice pitches and lattice angles. The stem 502 has a radius R502. The radius R502 may have a length in a range of 0.5-100 µm, or in certain embodiments 2-90 µm, or in further embodiments 3-50 µm, and in further embodiments 5-40 µm. The stem radius R502 has little effect on the resulting breakthrough pressure when the edge spacing is held constant; however, a larger stem radius R502 provides more mechanical stability at the expense of permeability. When the lattice pitch is held constant, an increased stem radius decreases the edge spacing and increases the breakthrough pressure.

The height H502 of the stem 502 may be 0 µm or greater, 2 µm or greater, 5 µm or greater, or 10 µm or greater. The height H502 may be 100 µm or less, 65 µm or less, 50 µm or less, or 20 µm or less. The height H502 may range from 0 µm to 65 µm, from 2 µm to 65 µm, from 2 µm to 20 µm, or from 10 µm to 50 µm. The stem height also has little effect on the resulting breakthrough pressure. The height H502 may be selected to accommodate the shape of the meniscus so that the liquid does not touch the underlying substrate. A shorter stem height H502 may increase the mechanical robustness of the hoodoo. The shape of the stem 502 also may have any number of sides and/or curves and, for example, may have a form with a cross-sectional shape including circles, squares, triangles, rectangles, hexagons, and combinations thereof.

The hoodoo 500 also includes cap 504. The cap may be centered on top of the stem 502. The cap 504 has a height H504, which may be measured as the thickness of the main part of the cap 504 from the upper/outer surface of the cap 504 to the outer radius (which is discussed further below). The height H504 of the cap 504 may be greater than 0 µm and 3 µm or less, 5 µm or less, or 10 µm or less. The height H504 may range from 0 µm to 10 µm, from 0 µm to 5 µm, or from 0 µm to 3 µm. The cap height H504 has little to no effect on the breakthrough pressure but may provide mechanical stability. The cap may also have a variety of shapes, which in a top-down view may include circles, squares, triangles, rectangles, hexagons, other geometric, regular, or irregular shapes, and combinations thereof.

The cap 504 of the hoodoo 500 includes an overhang portion 524. The overhang portion 524 is defined by an inner radius R520, an outer radius R522, and a hoodoo angle α526. The effect these parameters have on the breakthrough pressure are dependent on keeping either the lattice pitch or the edge spacing constant.

The re-entrant structures, generally, and the hoodoos, have an overall radius R500. The overall radius R500 may be the greatest (widest) radius of the re-entrant structure or hoodoo 500 when looking at the re-entrant structure or hoodoo 500 from above (e.g., from the direction of the cap 504). Often, the overall radius R500 is the radius at the widest part of the cap 504. Various parameters, including the stem radius R502 above, change the overall radius. Thus, if the lattice pitch is maintained as a constant, varying the various parameters will change the edge spacing, thus affecting A in Equation 4. In contrast, if the edge spacing is held constant, varying the various parameters will change the lattice pitch and affect $F_{CLV}$ and A in Equation 4 as well. The effect may be larger, smaller, or opposite (i.e., positive or negative) on the breakthrough pressure. A constant lattice pitch will also define boundaries for the inner radius, outer radius, stem radius, and hoodoo angle. These parameters affect the overall radius R500 and may be selected to allow for space between re-entrant structures without overlapping structures when disposed as an ordered plurality.

As shown in FIG. 5B, the cross-sectional shape of the underside of the cap 504 may be approximated by a circle 520, while the tip of the overhang 524 may be approximated by a circle 522, defining a double re-entrant hoodoo. The circle 520, which is closer to the stem 502 of the hoodoo 500 and may be thought of as the inner circle, has an inner radius R520. The inner radius R520 defines the arc that forms the indented portion of the underside of cap 504, which begins at the stem 502 and ends at the point where the inner circle 520 touches the outer circle 522. The slope of the cap underside surface 514 is the hoodoo angle α526 defined as the tangent of the outer circle 522 with a vertex 526 where the curvature of the underside surface 514 changes. The inner radius R520 may have any suitable length. In certain embodiments, the inner radius R520 is 0 µm or greater, 1 µm or greater, or 3 µm or greater. The inner radius R520 may be 500 µm or less, 100 µm or less, 50 µm or less, or 40 µm or less. The inner radius R520 may be in a range of 0 µm to 500 µm, 0 µm to 100 µm, 1 µm to 50 µm, or 3 µm to 40 µm. Increasing the inner radius R520 pushes the pinning point of the contact line outwards, decreasing the projected surface area of the liquid and increasing the breakthrough pressure at the expense of permeability since it increases the overall hoodoo radius.

If the inner radius R520 is increased infinitely, the underside surface 514 will approach a straight line rather than a curve. In certain embodiments, the underside surface 514' is defined by a straight line coming off of the stem 502, as shown in FIG. 5C for hoodoo 500'. The straight line may be sloped downward (toward the surface 101). In such cases, an inner width W524 is defined. The inner width W524 is the length from the stem 502 to the hoodoo angle vertex 526'.

The hoodoo 500' has an overhang 524', similar to hoodoo 500 of FIG. 5B, where the outer radius R522' is the radius of a circle 522' that closely approximates the shape of the overhang 524'.

The outer radius R522, R522' may have any suitable length. In some embodiments, the outer radius R522, R522' is 0 μm or greater, 1 μm or greater, or 5 μm or greater. The outer radius R522, R522' may be 100 μm or less, 50 μm or less, 25 μm or less, or 10 μm or less. The outer radius R522, R522' may be in a range of 0 μm to 100 μm, 0 μm to 50 μm, 0 μm to 25 μm, or 0 μm to 10 μm. An outer radius of 0 μm is considered a point. The outer radius has a significant effect on the breakthrough pressure. With a constant edge spacing, a smaller outer radius will increase the breakthrough pressure by increasing the vertical component of the contact line force, $F_{CLV}$, and decreasing A (e.g., by pushing the contact line outward from the hoodoo). With a constant lattice pitch, a smaller outer radius R522, R522' decreases the overall hoodoo radius R500, R500', and therefore the edge spacing increases, decreasing the vertical component of the contact line force, $F_{CLV}$, and increasing A leading to a decrease in breakthrough pressure.

The hoodoo angle α526, α526' may be −10 degrees or greater, 0 degrees or greater, 30 degrees or greater, 45 degrees or greater, or 60 degrees or greater. The hoodoo angle α526, α526' may be 90 degrees or less or 60 degrees or less. The hoodoo angle α526, α526' may be in a range of −10 degrees to 90 degrees, 0 degrees to 90 degrees, 45 degrees to 90 degrees, or 60 degrees to 90 degrees. The hoodoo angle increases the breakthrough pressure when it is near 90 degrees. As the hoodoo angle approaches 90 degrees, the vertical component of the contact line force increases and contributes to an increase in breakthrough pressure. When a hoodoo structure has an inner radius approaching infinity and a hoodoo angle of 0 degrees, the hoodoo may be considered a single re-entrant structure.

Figure 5D:
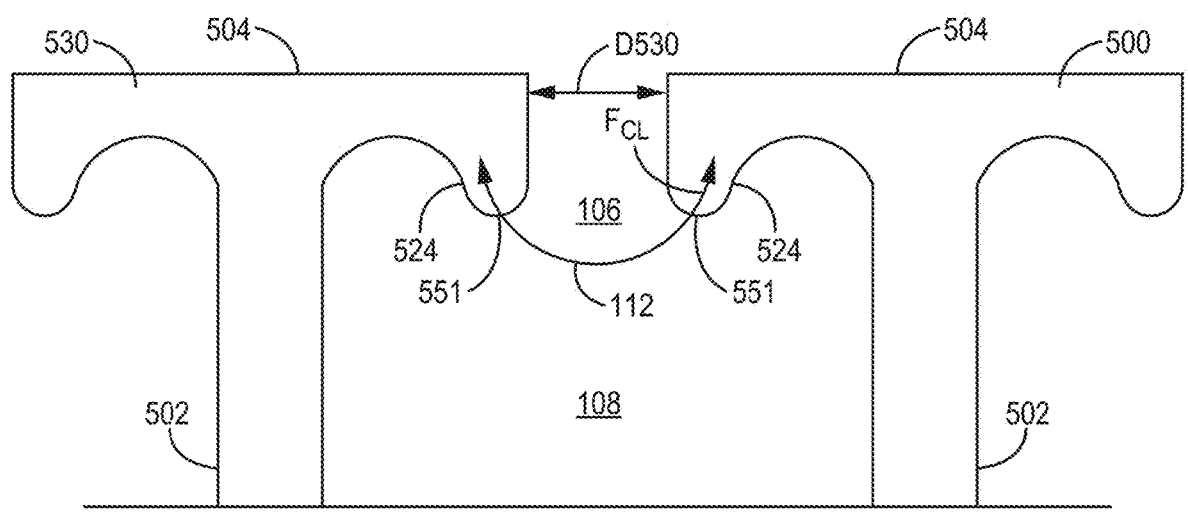
FIG. 5D is a cross-sectional view of a pair of hoodoo structures showing a contact line force for a droplet, in accordance with certain embodiments.

As set forth herein, the hoodoo structures (or re-entrant structures) are disposed as a plurality of structures on a material surface. The plurality may be disposed as an ordered arrangement as set forth above, and in certain embodiments, the structures are formed in an array. FIG. 5D illustrates two adjacent hoodoos 530, 532. The two structures are spaced apart by a distance D530, referred to herein as the edge spacing. When designing a re-entrant material, the edge spacing may be selected based on the expected contaminants the porous material will come into contact with. For example, the edge spacing may be 1 μm or greater, 2 μm or greater, 5 μm or greater, or 10 μm or greater for low surface tension liquids (e.g., <30 mN/m). The edge spacing may be 50 μm or less, 30 μm or less, 20 μm or less, or 10 μm or less for low surface tension liquids (e.g., <30 mN/m). The edge spacing may be in a range of 1 μm to 30 μm for low surface tension liquids (e.g., <30 mN/m). The edge spacing may be 10 μm or greater, 30 μm or greater, 50 μm or greater, or 100 μm or greater and up to 2 mm for high surface tension liquids (e.g., >30 mN/m).

As set forth above in connection with FIG. 4, a plurality of re-entrant structures may be arranged in an array. The array of re-entrant structures may have rows of re-entrant structures oriented at an angle, the lattice angle, in a lattice. The lattice angle may be 45 degrees or greater, 60 degrees or greater, or 75 degrees or greater. The lattice angle may be 90 degrees or less, 75 degrees or less, or 60 degrees or less. In some embodiments, the lattice angle is in a range of 45-90 degrees. In certain embodiments, and when the lattice is a square lattice, the angle would be ninety degrees.

Figure 5E:
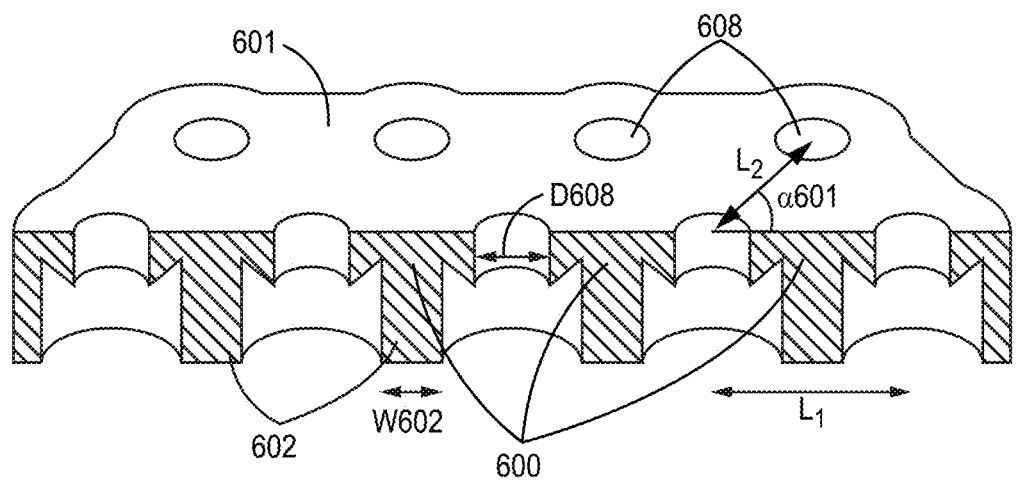
FIG. 5E is a cross-sectional perspective view of a continuous hoodoo structure showing various dimensions, in accordance with certain embodiments.

In some embodiments, the plurality of hoodoos (or re-entrant structures) is arranged as a plurality of connected structures to form a continuous hoodoo structure (or continuous re-entrant structure). The plurality of structures may be connected at one or more points. For example, a plurality of hoodoos or re-entrant structures may be attached at the cap or at the cap and the stem in a continuous hoodoo structure. An exemplary embodiment of a continuous re-entrant structure is shown in FIG. 5E. A plurality of re-entrant structures 600 are attached to each other to form a continuous re-entrant lattice 601 and a plurality of pores 608 dispersed throughout the lattice 601. The lattice 601 forms an outer surface 605. The lattice 601 is defined by a first lattice pitch $L_1$ (center-to-center pore spacing in a first direction) and a second lattice pitch $L_2$ (center-to-center pore spacing in a second direction) and a lattice angle α601 defined as the angle between the first direction and the second direction. The re-entrant structures 600 in a continuous re-entrant lattice 601 may be disposed as an ordered plurality, as shown, or disposed at random. A single continuous re-entrant structure may form a re-entrant layer as discussed above or may be coupled with additional continuous re-entrant structures. In some embodiments, the re-entrant structures are arranged such that the spaces between the re-entrant structures form an elongated channel.

The re-entrant geometry structures 600 of the continuous re-entrant lattice 601 of FIG. 5E include a base 602 (comparable to the stem 502 of the hoodoo 500). The base 602 has a width, W602, which refers to the width at the base of the re-entrant structure 600 as measured along the center-to-center line between two adjacent pores 608. The width W602 does not affect breakthrough pressures, but it contributes to the overall permeability of the continuous re-entrant lattice 601 and the permeability of the composite material when the continuous re-entrant lattice 601 is disposed on a porous material. A hoodoo base width W602 has a range of 0.5-100 μm, or in certain embodiments 2-90 μm, or in further embodiments 3-50 μm, or in still further embodiments 5-40 μm. The width may vary along the length of the stem, and a varying width may provide further advantages in permeability or manufacturing.

The pores 608 of the continuous lattice structure 601 have a pore diameter D608. The pore diameter D608 is the spacing between the outermost edges of the adjacent re-entrant structures. The pore diameter D608 may be analogous to the edge spacing D530 (space between hoodoos). The pore diameter D608 may be 1 μm or greater, 2 μm or greater, 5 μm or greater, or 10 μm or greater for low surface tension liquids (e.g., <30 mN/m). The pore diameter D608 may be 30 μm or less, 20 μm or less, or 10 μm or less for low surface tension liquids (e.g., <30 mN/m). The pore diameter D608 may be in a range of 1 μm to 30 μm for low surface tension liquids (e.g., <30 mN/m). The pore diameter D608 may be 10 μm or greater, 30 μm or greater, 50 μm or greater, or 100 μm or greater and up to 2 mm for high surface tension liquids (e.g., >30 mN/m). As may be seen, the pore diameter directly affects A in Equation 4.

The permeability of a continuous hoodoo or re-entrant structure is also affected by the lattice pitch $L_1$, $L_2$, as shown in FIG. 5E. As the lattice pitch for a continuous hoodoo or re-entrant structure is the center-to-center spacing between the pores, the lattice pitch encompasses the pore diameter and the cross-sectional dimension of the re-entrant structure.

A decreased lattice pitch with a constant re-entrant structure length (or diameter) will result in a decreased pore diameter, decreasing A in Equation 4 and increasing the breakthrough pressure.

In addition, the hoodoos or re-entrant structures that make up the continuous hoodoo or re-entrant structure (lattice) share many of the same dimensions as the discrete hoodoos or re-entrant structures discussed above in connection with an ordered plurality of hoodoos. For example, the stem height H602 of each structure may be 0 μm or greater, 2 μm or greater, 5 μm or greater, or 10 μm or greater. The stem height H602 be 100 μm or less, 65 μm or less, 50 μm or less, or 20 μm or less. The height H602 may range from 0 μm to 65 μm, from 2 μm to 65 μm, from 2 μm to 20 μm, or from 10 μm to 50 μm. In a continuous hoodoo or re-entrant structure (lattice), the stem heights are substantially uniform across the continuous structure as the hoodoos are attached together to form a substantially flat outer surface 605. Herein, "substantially flat" refers to a surface that is planar but may deviate within manufacturing tolerances. Even though the hoodoo structures are attached at the caps, the cap height H604 may still be measured from the upper/outer surface of the cap to the outer radius. The height H604 of the cap 604 may be 0 μm or greater and 3 μm or less, 5 μm or less, or 10 μm or less. The height H504 may range from 0 μm to 10 μm, from 0 μm to 5 μm, or from 0 μm to 3 μm.

The re-entrant geometry structures 600 of the continuous re-entrant lattice 601 may be double re-entrant structures (as shown in FIG. 5E), or may be configured as single re-entrant structures. Similar to the discrete hoodoo structures of FIGS. 5B and 5C, the connected hoodoos (re-entrant geometry structures 600) of the continuous lattice structure 601 may be contoured and approximated by an inner circle 520, an inner radius R520, an outer circle 522, and outer radius R522, or may have an underside defined by a straight line and an inner width W524. The dimensions of the inner radius R520, outer radius R522, inner width W524, and hoodoo angle α526 may be as described above with regard to FIGS. 5B and 5C.

An inverted meniscus may reduce, minimize, or prevent the liquid from wetting through to the underlying surface of the substrate 202. When the hoodoo structures, in an ordered plurality or in a continuous lattice structure, are in contact with a liquid (e.g., a contaminant), they perform their repellent function by flipping the meniscus 112 of the liquid (i.e., inverting the contact line force). The contact line force $F_{CL}$ of the liquid on the surface of the hoodoo structures 500 is illustrated by arrows. The contact line force $F_{CL}$ indicates a point 551 on each hoodoo structure cap 504 where the liquid meniscus 112 pins to the structures. As set forth above, the edge spacing D530 is selected to keep the structures close enough to prevent the liquid from breaking through the plurality of re-entrant structures 500 to reach, and wet, the surface of the porous substrate 202. As may be recognized by the breakthrough pressure equation (Equation 4) and the vertical contact line force equation (Equation 1), there are three competing parameters to maximize the breakthrough pressure: 1) the length l of the contact line (connected pinning points 551), 2) the projected area of the liquid surface (A), and 3) the angle a (optimizing the angle a in Eq. 1 by getting θ—a as close to 90 degrees as possible). The maximum pressure is a balance between increasing or maximizing l in Equation 1 and reducing, or minimizing, A in Equation 4. This balance contributes to the selection of the re-entrant geometry for the plurality of structures, whether ordered or continuous, and the specific parameters therefore. When the liquid (e.g., contaminant) breaks through, the pores of the substrate material may clog and reduce, or redirect, the escaping air flow.

Figure 6A:
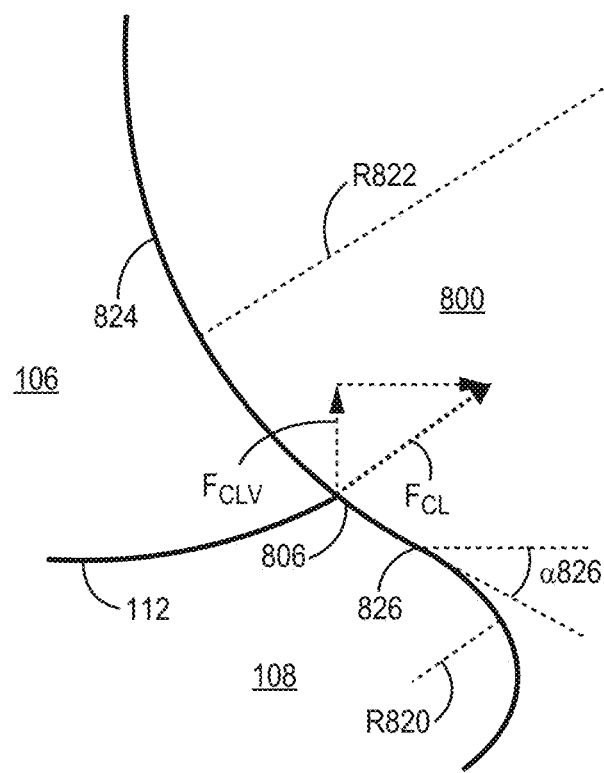
FIG. 6A is a schematic diagram of contact line force for a hoodoo structure geometry having low breakthrough pressure, in accordance with certain embodiments.

Referring now to FIGS. 6A-7B, the geometry and dimensions of the re-entrant structures may be designed so that the meniscus of a liquid in contact with the re-entrant structures may be flipped or inverted and to increase the breakthrough pressure for a given liquid (e.g., expected contaminant). FIG. 6A illustrates a first example, where a hoodoo 800 has a gradual slope at the cap overhang 824 such that the structure has a low hoodoo angle α826, a large outer radius R822, and a small inner radius R820. The contact line will pin close to the hoodoo angle point 826, or where the two arcs forming the inner and outer radius R820, R822 meet. In FIG. 6A, the meniscus 112 pins to the hoodoo along a gradual slope 806. The combination of a low hoodoo angle α826 and an inner radius R820 being significantly smaller than the outer radius R822 provides a small $F_{CLV}$ in the vertical direction because the angle of $F_{CL}$ is significantly less than ninety degrees relative to the horizontal plane. This contact line force angle results in a low breakthrough pressure for the liquid and hoodoo geometry.

Figure 6B:
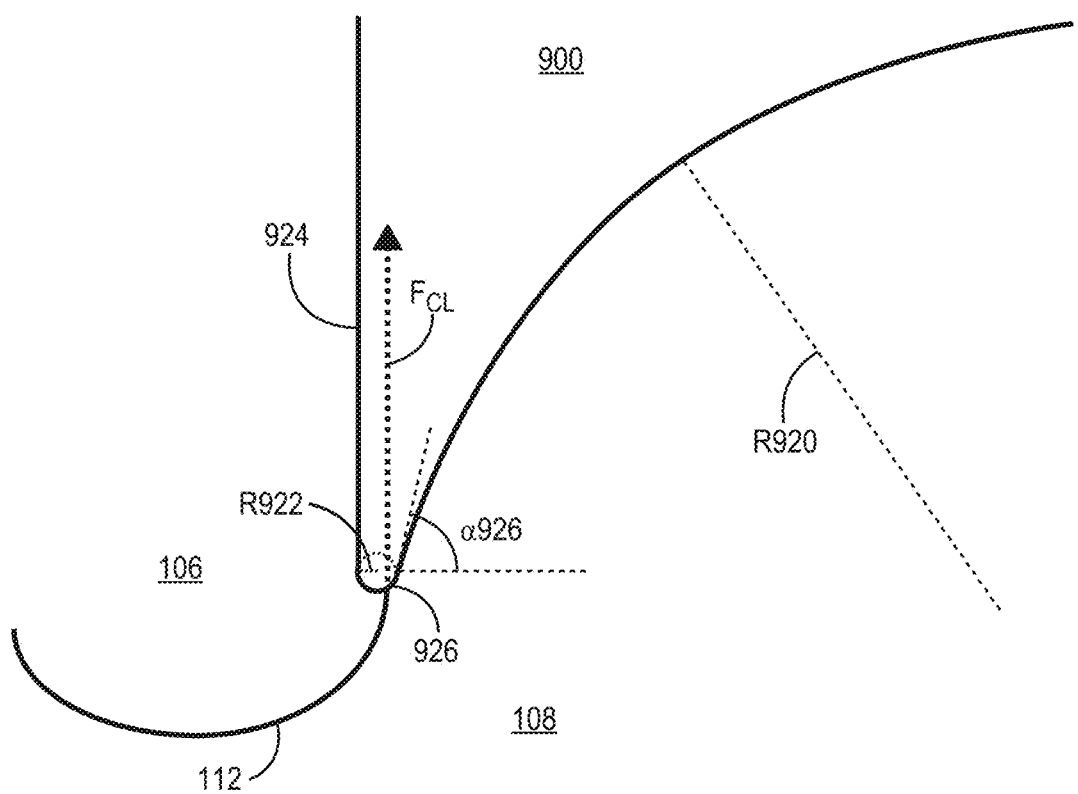
FIG. 6B is a schematic diagram of contact line force for a hoodoo structure geometry having high breakthrough pressure, in accordance with certain embodiments.

To increase the breakthrough pressure for the same liquid, the dimensions of the hoodoo structure may be modified. FIG. 6B illustrates a modified hoodoo structure 900 with a higher breakthrough pressure than the hoodoo structure 800 in FIG. 6A. In FIG. 6B, the inner radius R920 is significantly larger than the outer radius R922 and the hoodoo angle α926 is larger than that of FIG. 6A. The meniscus 112 still pins close to the hoodoo angle point 926 and, in this case, results in the contact line pinning closer to the tip of the hoodoo 900 at an angle approximately normal to the porous substrate surface. The corresponding contact line force $F_{CL}$ also extends at an angle approximately 90 degrees with respect to the horizontal plane, maximizing the vertical portion of the $F_{CL}$. This contact line force $F_{CL}$ provides a much higher breakthrough pressure, which increases the repellency of the re-entrant layer.

Various parameters affect the breakthrough pressure of a liquid on re-entrant structures, and these parameters are described in connection with FIGS. 7A-7B. Breakthrough pressure is the pressure at which the liquid penetrates the re-entrant structures and likely wets through to the porous material surface. The vertical component of a droplet's contact line force may be used to determine the breakthrough pressure for a given liquid. The breakthrough pressure differs depending upon the surface tension of the liquid involved as well as the re-entrant structures' geometric parameters.

Figure 7A:
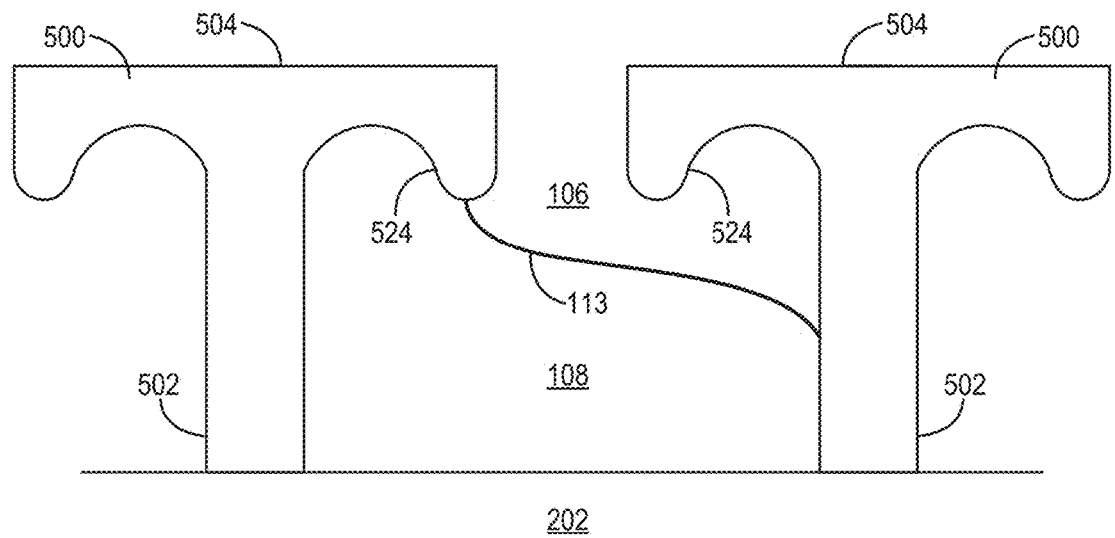
FIG. 7A is a cross-sectional view of a pair of ordered hoodoo structures showing a breakthrough pressure failure mode, in accordance with certain embodiments.

As shown in FIG. 7A, a liquid may reach a breakthrough pressure and release from one or more of the points at which the liquid pins to a hoodoo. This is referred to as contact line runaway, which occurs when the contact line moves past its pinning point at a pressure threshold (e.g., maximum or breakthrough pressure). The point at which runaway occurs is typically around the hoodoo angle point (e.g., where the two arcs meet). Here, the meniscus 113 of a droplet among the hoodoo structures 500 releases from the cap 504 of a hoodoo 500 to contact the stem 502 and "runs down" the stem. Thus, the liquid is no longer repelled by the surface of the re-entrant structures and may reach the pores of the substrate 202 porous material. Contact line runaway is the failure mode most likely experienced for lower surface tension liquids since their contact line force is lower.

Figure 7B:
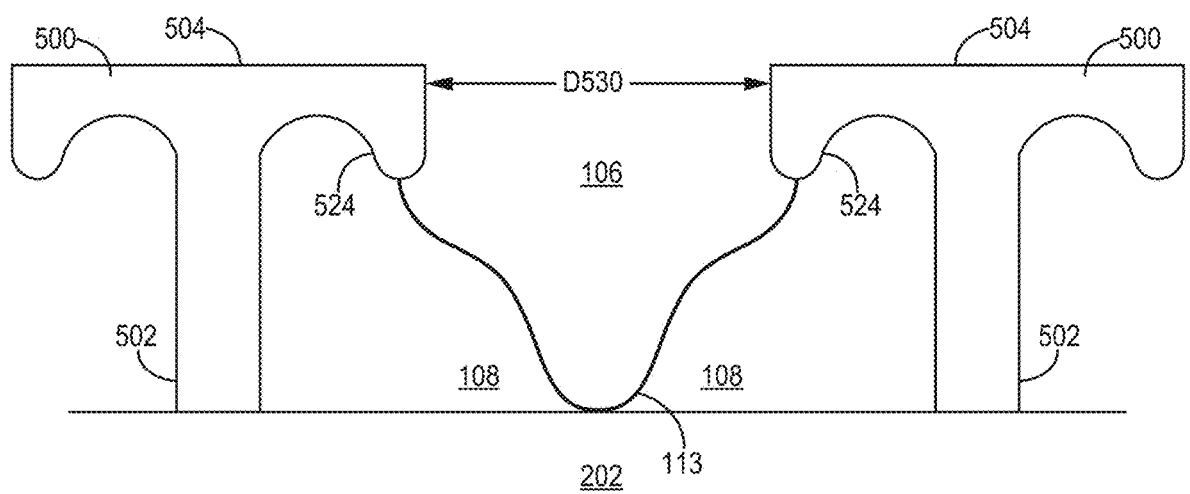
FIG. 7B is a cross-sectional view of a pair of ordered hoodoo structures showing another breakthrough pressure failure mode, in accordance with certain embodiments.

An alternative breakthrough scenario is shown in FIG. 7B and is a failure mode referred to as surface collapse. This failure mode is most likely experienced with higher surface tension liquids with high contact line forces. The droplet 106 maintains the pinning points at the hoodoo caps 504, but the weight of the droplet 106 pushes the meniscus 113 down to the substrate surface 202. Shortening the hoodoo spacing D530 to bring the hoodoo structures 500 closer together, or increasing the stem 502 height, may increase the breakthrough pressure for a given liquid. For example, even if the hoodoo cap 504 provides a high breakthrough pressure, if the stem height is so low that the meniscus 113 still reaches the underlying substrate 202, the liquid will wet through and the re-entrant structure will fail to repel the liquid.

FIGS. 11A-13C illustrate a re-entrant structures 1500, 1530, 1550 according to an alternative embodiment. These re-entrant structures 1500, 1530, 1550 have double re-entrant geometries, including re-entrant geometries relative to a horizontal plane (the x-z plane), as well as additional re-entrant geometries in at least one plane orthogonal to the horizontal plane (the x-y plane and/or the y-z plane). The x-z plane is the plane parallel to the substrate that the re-entrant structures 1500, 1530, 1550 are disposed on. The re-entrant structures 1500, 1530, 1550 include a first re-entrant geometry about their caps 1504, 1534, 1554. In addition, the re-entrant structures 1500, 1530, 1550 include second re-entrant geometries about their stems 1502, 1532, 1552. Re-entrant structures with a re-entrant geometry in the x-z plane may be used to reduce or prevent contamination or cross-wetting of neighboring structures in the event of a breakthrough. Further, additional planes of re-entrant geometries may help remediate possible imperfections due to manufacturing of very small structures.

Figure 11A:
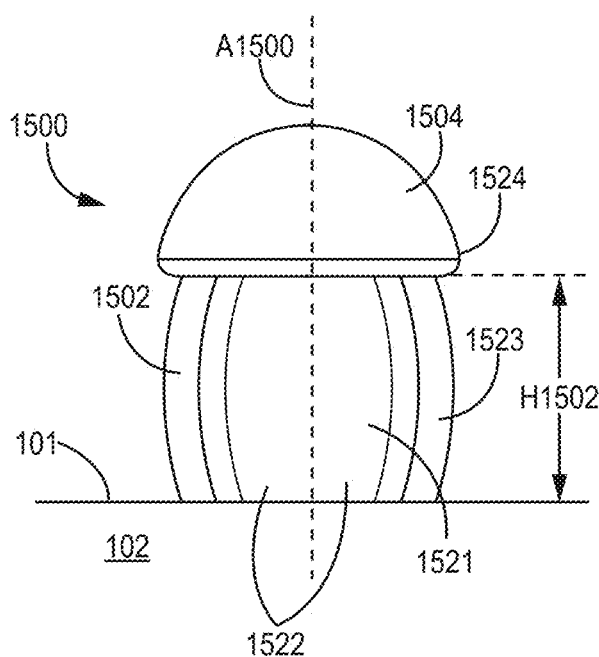
FIGS. 11A-11C are various views of a re-entrant structure, in accordance with certain embodiments.
Figure 11B:
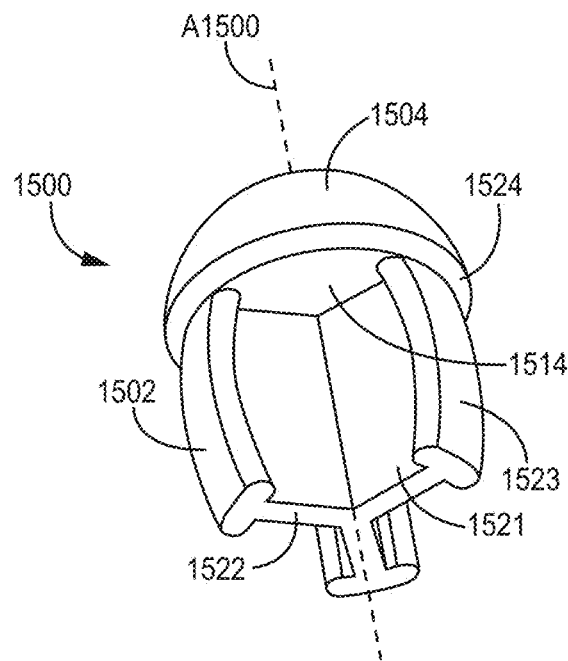
Figure 11C:
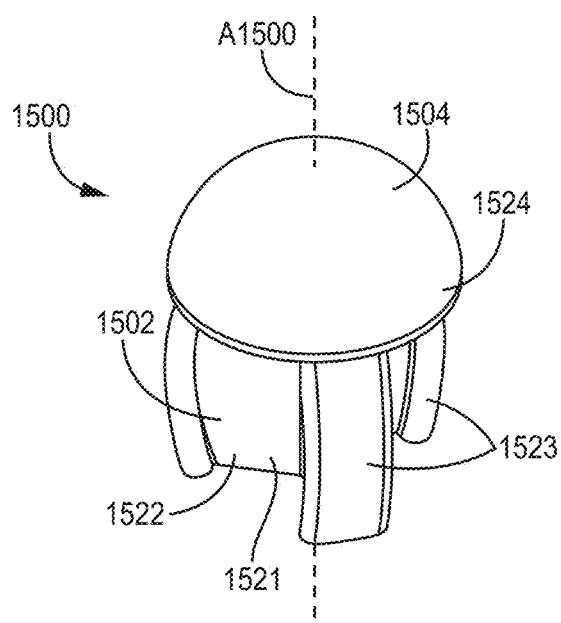
Figure 12A:
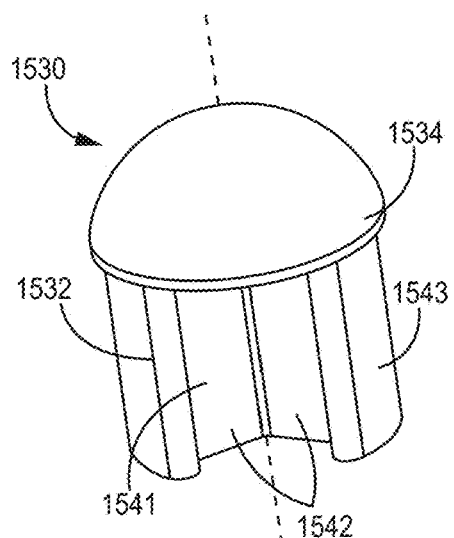
FIG. 12A is a perspective view of a re-entrant structure, in accordance with certain embodiments.
Figure 12B:
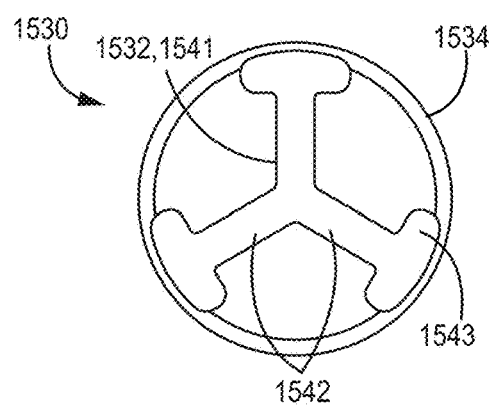
FIG. 12B is a cross-sectional bottom view of the re-entrant structure of FIG. 12A.

Referring now to FIGS. 11A-11C, the re-entrant structure 1500 includes a stem 1502 extending from a surface 101 of a substrate 102, and a cap 1504 extending from the stem 1502. The cap 1504 provides a first re-entrant geometry as described, for example, in reference to FIGS. 2A-2C. The cap 1504 may define a continuous contoured top surface. In some embodiments, the cap 1504 may have a semispherical surface. However, other shapes, including a substantially flat top, are also possible. The lower edge of the cap 1504 may form an overhang 1524 extending downward toward the surface 101. The re-entrant structure 1500 defines a longitudinal center axis A1500. The axis A1500 may be perpendicular to the surface 101.

The stem 1502 may extend along the longitudinal center axis A1500. The stem 1502 has a height H1502. The stem 1502 may be formed as a webbed beam and may include webbed core portion 1521 and lobes 1523. The webbed core portion 1521 may have a three-pronged cross-section as shown in FIG. 11B, including three webs 1522. Other shapes are also possible, such as a four-pronged or star-shaped cross-section. The lobes 1523 may extend sideways from the edge of the core portion 1521 and axially along the edge. The lobes 1523 may be slightly outwardly (away from the longitudinal center axis A1500) curved. The lobes 1523 form a second re-entrant geometry in the x-z plane (parallel to the substrate 102 surface 101).

The dimensions of the re-entrant structures 1500, 1530, 1550 may be similar to the hoodoo 500 described above, including stem height, cap height, and overall radius. However, due to the stem structure, the stem width may be wider than that of hoodoo 500, and may be similar to the overall radius.

The re-entrant structures 1530, 1550 of FIGS. 12A-13C are similar to the re-entrant structure 1500 except for the curvature of the webs 1542, 1562 and lobes 1543, 1563. The stem 1532 of the re-entrant structure 1530 in FIGS. 12A and 12B has a core 1541 with webs 1542 that have straight edges parallel to the longitudinal center axis A1530. The lobes 1543, which extend along the edges of the webs 1542, are also parallel to the longitudinal center axis A1530.

Figure 13A:
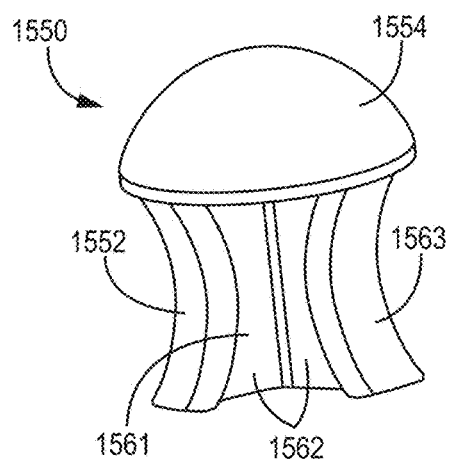
FIG. 13A is a perspective view of a re-entrant structure, in accordance with certain embodiments.
Figure 13B:
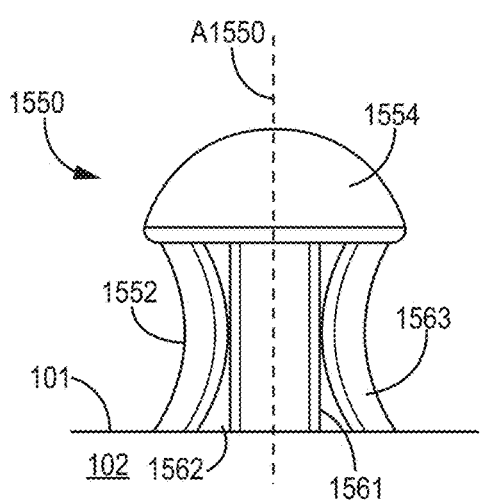
FIG. 13B is a side view of the re-entrant structure of FIG. 13A.
Figure 13C:
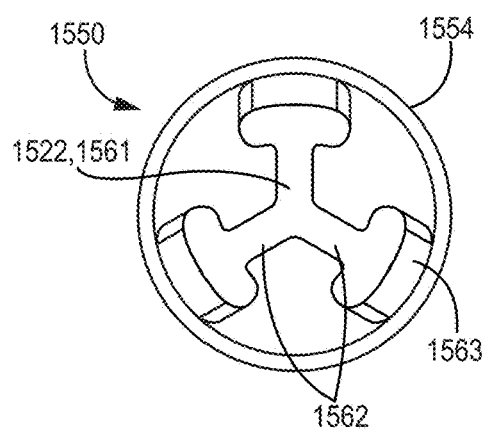
FIG. 13C is a cross-sectional bottom view of the re-entrant structure of FIG. 13A.

The stem 1552 of the re-entrant structure 1550 in FIGS. 13A-13C has a core 1561 with webs 1562 that have concave edges relative to the longitudinal center axis A1550. The lobes 1563, which extend along the edges of the webs 1562, are also concave relative to the longitudinal center axis A1550.

In some embodiments, it may be desirable to provide a continuous re-entrant structure (lattice) with drains. In practice, when a continuous re-entrant structure (lattice) is applied onto a relatively large surface area, the lattice may include one or more imperfections, such as pores that are larger than intended. Such imperfections may cause breakthroughs of liquid even if otherwise the lattice and re-entrant structures are designed and configured to repel the intended contaminant. The continuous re-entrant structure (lattice) may be provided with drains or exit structures to allow any possible breakthrough liquid to escape rather than to penetrate adjacent pores. The term breakthrough liquid is used here to refer to a liquid that has broken through the repellent barrier provided by the re-entrant structures. Breakthrough liquid may have come into contact with the substrate surface. Various examples of drains and exit structures to direct breakthrough liquid are shown in FIGS. 14A to 19.

Figure 14A:
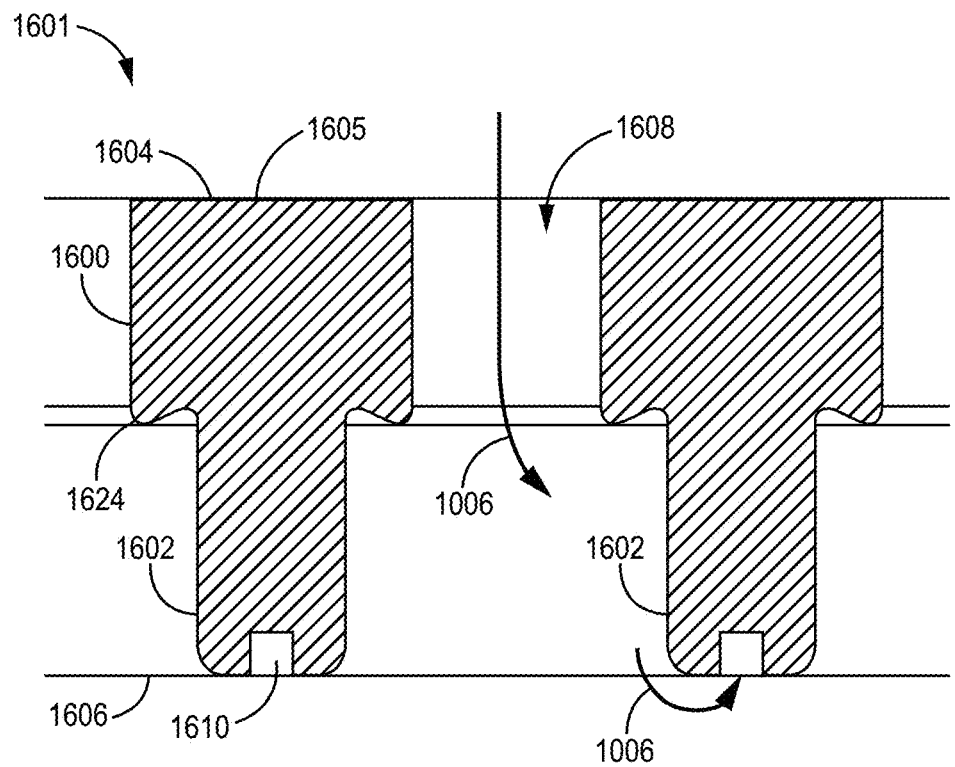
FIG. 14A is a cross-sectional side view of a continuous lattice with re-entrant hoodoo structures and drainage channels, in accordance with certain embodiments.
Figure 14B:
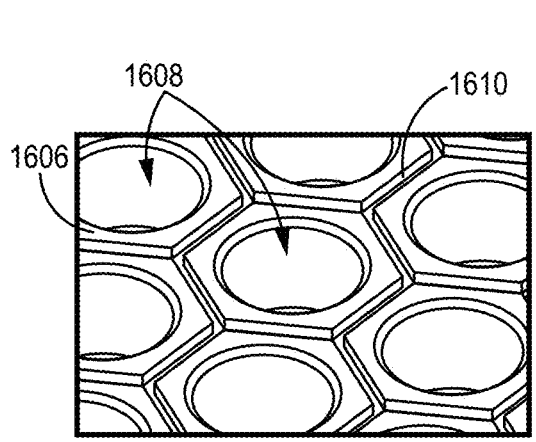
FIG. 14B is a bottom perspective view of the continuous lattice of FIG. 14A.
Figure 14C:
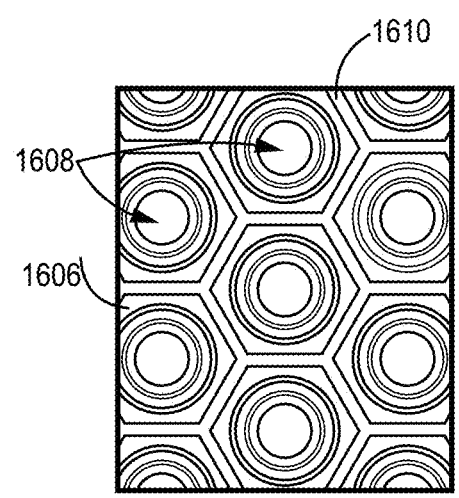
FIG. 14C is a bottom view of the continuous lattice of FIG. 14A.
Figure 15A:
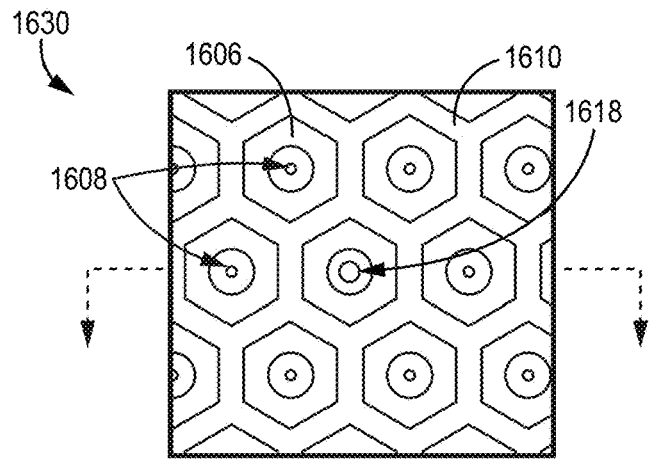
FIG. 15A is a bottom perspective view of a continuous lattice with re-entrant hoodoo structures and drainage channels, in accordance with certain embodiments.
Figure 15B:
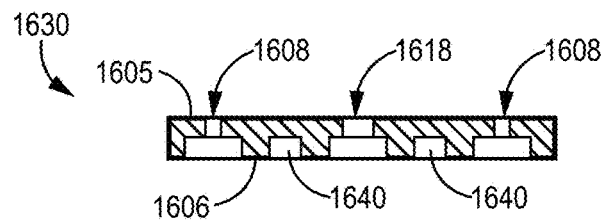
FIG. 15B is a cross-sectional side view of the continuous lattice of FIG. 15A.
Figure 16A:
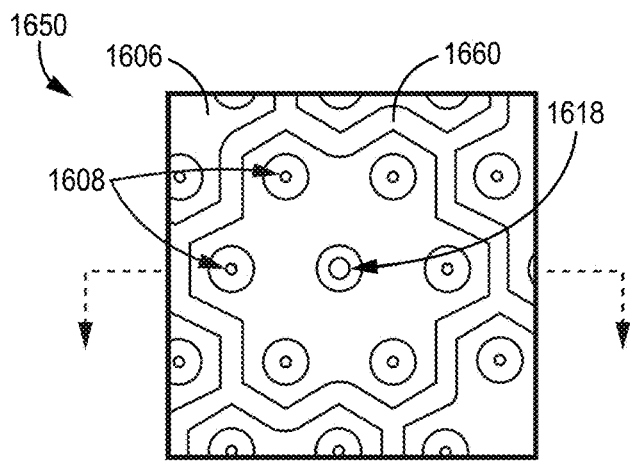
FIG. 16A is a bottom perspective view of a continuous lattice with re-entrant hoodoo structures and drainage channels, in accordance with certain embodiments.
Figure 16B:
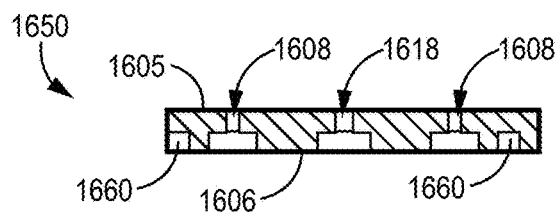
FIG. 16B is a cross-sectional side view of the continuous lattice of FIG. 16A.
Figure 17:
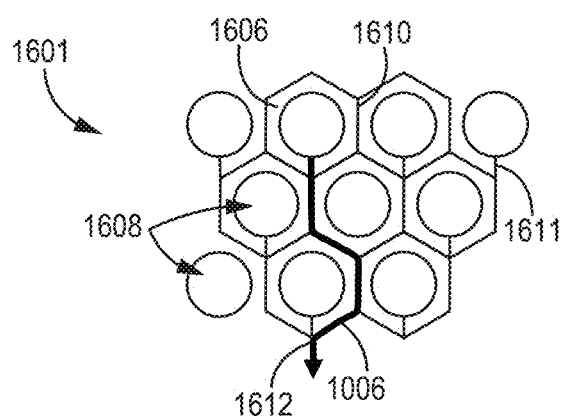
FIGS. 17-21 are schematic bottom views of continuous lattices with re-entrant hoodoo structures and drainage channels, in accordance with certain embodiments.
Figure 18:
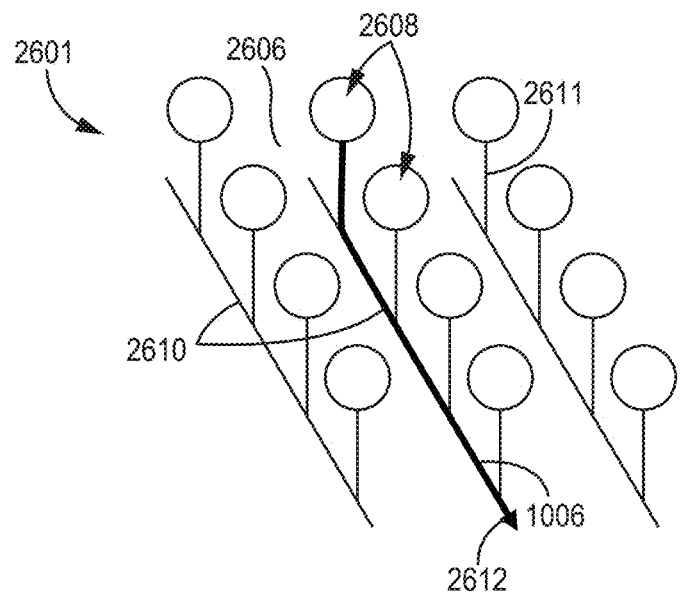
Figure 19:
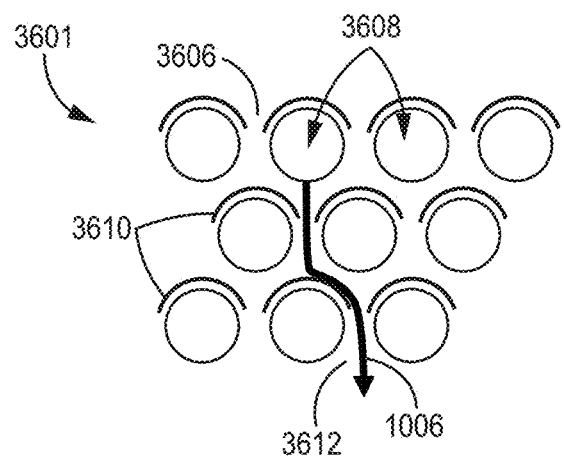
Figure 20:
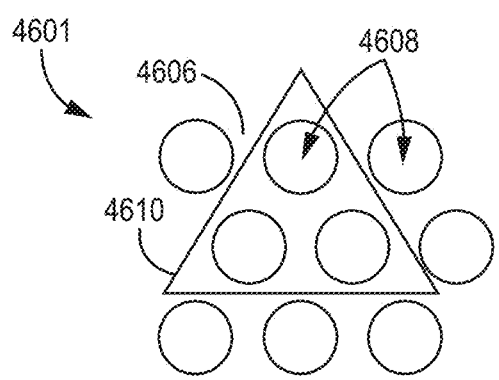
Figure 21:
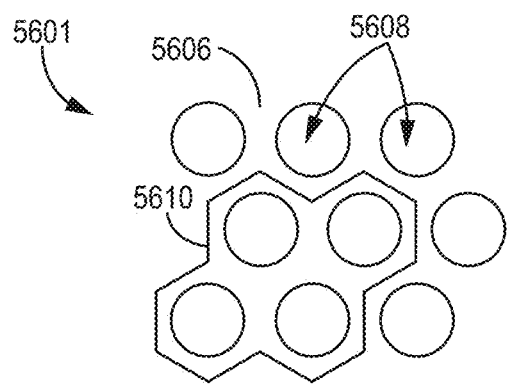

Referring now to FIGS. 14A-14C, the continuous re-entrant structure (lattice) 1601 includes a plurality of re-entrant structures 1600 connected to one another, and a plurality of pores 1608 formed between the plurality of re-entrant structures 1600. The re-entrant structures 1600 include caps 1604, which form the outer surface 1605 of the lattice. The re-entrant structures 1600 include stems 1602 that define a bottom surface 1606 of the lattice. The caps 1604 may include an overhang 1624 as previously described. In some instances, liquid 1006 may break through and enter one of the pores 1608. The bottom surface 1606 may include one or more grooves or drains 1610. Any liquid 1006 that enters the pore 1608 may flow into the drain 1610. The drain 1610 may be sized so that the liquid can flow away from the pore via capillary action. Bottom perspective view of the bottom surface 1606 with hexagonal drains 1610 around the pores 1608 is shown in FIG. 14B.

FIGS. 15A-15B and 16A-16B illustrate embodiments, where the lattice 1630, 1650 includes an imperfection in the form of a larger pore 1618. A larger pore 1618 may result in liquid breakthroughs. The lattice 1630, 1650 includes drains 1640, 1660 that allow any breakthrough liquid to be drained away from the pores. The drains 1640, 1660 may be configured such that each pore 1608 is surrounded by a drain 1640 (as in FIG. 15A), or that a plurality of pores 1608 are grouped together and surrounded by a drain 1660 (as in FIG. 16A).

The drains may be configured in any suitable way and may include different geometries and pore groupings, as shown in FIGS. 17-21. While many possible configurations and shapes may be used, structures that utilize hexagons or a honey-comb like structure may be more closely packed and result in a more efficient lattice structure. The pores may be grouped within the drain geometries in various ways. The number of pores within a drainage structure may be determined based, among other things, on desired efficiency of drainage (fewer pores per drainage structure results in more efficient drainage), the impact on structural integrity (drainage structures spaced further apart result in better structural integrity), and the estimated need for drainage (an estimated population density of breakthrough structures). In some embodiments, the number of pores per drainage structure (one continuous drain loop) is 1 or greater and up to 50, up to 25, up to 10, up to 7, or up to 4. In some embodiments, each pore of the lattice is adjacent to a drain. A lattice may include drainage structures of different shapes and sizes. In some embodiments, various tessellating patterns of drainage structures may be used to adjust the group size. In some embodiments, the drainage structures form channels that extend the entire width of the substrate. In other embodiments, the channels only extend part of the width of the substrate.

In some embodiments, the drains 1610, 2610 include a stem 1611, 2611 leading from the pores 1608, 2608 to the main drain conduit 1610, 2610. The drains 1610, 2610 may further include an exit structure 1612, 2612 where the liquid 1006 flowing in the drain may exit. In many embodiments, the drain 1610, 2610, 4610, 5610 is formed by a groove in the bottom surface 1606, 2606, 4606, 5606. However, in some embodiments, the lattice 3601 may include protrusions that form a hood 3610 over the pores 3608. Some drain structures may be suitable for directing flow in a vertical or sloped arrangement where the bottom surface 1606, 2606, 3606, 4606, 5606 is oriented vertically or is sloped. Some drain structures, such as those shown in FIGS. 17, 20, and 21, may be well suited for directing flow in any orientation, whether vertical, sloped, horizontal, or "upside down" (bottom surface 1606, 4606, 5606 facing up).

The drains and exit structures may have any suitable dimensions. In some embodiments, the drains and exit structures are sized to encourage capillary flow. For example, the drains and exit structures may be sized based on desired capillary pressure based on the following Equation 7:

$$\Delta P = \frac{2\gamma \cos\theta}{r} \qquad \text{Equation 7}$$

where ΔP is the Laplace pressure, γ is the surface tension, θ is the contact angle, and r is the radius of the channel. By selecting the dimensions such that ΔP is positive, the drains and exit structures can encourage capillary flow. In some embodiments, the drains and exit structures have a cross-sectional dimension (e.g., radius) of 100 µm or greater, 200 µm or greater, 300 µm or greater, 400 µm or greater, or 500 µm or greater. The cross-sectional dimension (e.g., radius) may be 1 mm or less, 800 µm or less, 600 µm or less, 500 µm or less, 400 µm or less, 300 µm or less, or 250 µm or less. In some cases, the drains and exit structures have a cross-sectional dimension (e.g., radius) in the range of 100 µm to 1 mm, from 100 µm to 500 µm, from 100 µm to 250 µm, from 250 µm to 1 mm, or from 500µ to 1 mm.

The layered material may further include absorbent or adsorbent material intended for absorbing or adsorbing any breakthrough liquid. Such absorbent or adsorbent material may optionally be placed near an exit structure 1612, 2612 of a drain.

In some embodiments, the re-entrant layer may be constructed to have regions or zones. For example, in some embodiments, the re-entrant layer as two or more different types of re-entrant structures that are grouped together as subsets of structures. The re-entrant structures of a given region may be either discrete re-entrant structures or may form a continuous re-entrant structure (e.g., a lattice). In some cases, the re-entrant layer may include alternating regions of discrete re-entrant structures and regions of continuous re-entrant structures. In some embodiments, the re-entrant layer may include alternating regions of different kinds of re-entrant structures. For example, the re-entrant layer may include alternating regions of a first type of re-entrant structure and of a second type of re-entrant structure. Providing regions of different types of re-entrant structures and/or re-entrant structures and a continuous re-entrant structure may be desirable to provide the material with different properties that can be achieved with the different regions. For example, one region may provide good repellency and another region may provide good drainage. Or one region may facilitate throughflow and another region may provide cross-flow. Different regions may also be used to reduce complexities in manufacturing by reducing the number of structures that may have a desirable property but may be difficult to manufacture. Such structures may be balanced with structures that are easier to manufacture.

Figure 22:
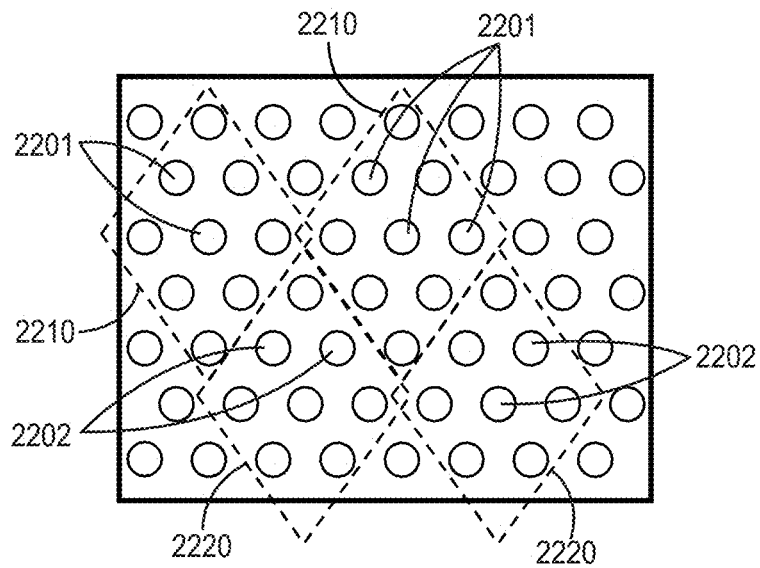
FIG. 22 is a schematic top view of re-entrant layers with a plurality of zones, in accordance with certain embodiments.
Figure 23:
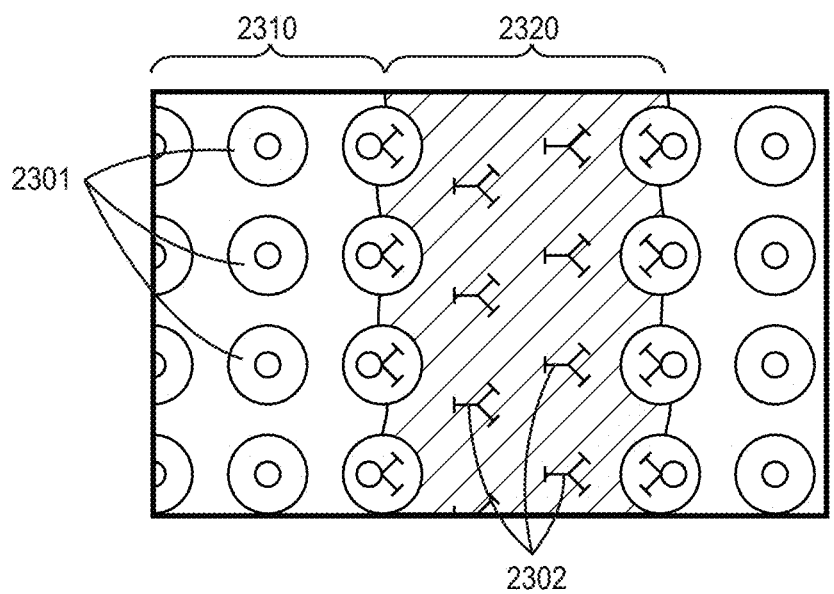
FIG. 23 is a schematic top view of re-entrant layers with a plurality of zones that form a throughflow channel and a cross-flow channel, in accordance with certain embodiments.

Examples of re-entrant layers with a plurality of zones are shown in FIGS. 22 and 23. In FIG. 22, re-entrant structures of a first type 2201 are alternated with re-entrant structures of a second type 2202. The re-entrant structures of a first type 2201 form a first zone 2210 and the re-entrant structures of a second type 2202 form a second zone 2220. In FIG. 23, re-entrant structures of a first type 2301 form a first region 2310 that provides a throughflow channel and re-entrant structures of a second type 2302 for a second region 2320 that provides a cross-flow channel. The re-entrant structures of the first type 2301 may be hoodoos with a stem and a cap. The re-entrant structures of the second type 2302 may be similar to re-entrant structures 1500, 1530, 1550 in FIGS. 11A-13C with the exception that the re-entrant structures of the second type 2302 lack a cap.

Re-entrant structures may be formed using a variety of methods, including embossing, etching, and microfabrication. The formation method for creating re-entrant structures may be selected based on the desired dimensions for the structures. Various methods for forming re-entrant structures are described below.

One example method involves microfabrication using a polymer substrate. First the polymer substrate is provided. Next, a photoresist pattern is deposited on the substrate surface. The photoresist pattern involves forming rings. Using a mixed gas reactive ion etching under the photoresist, the ring feature is formed in the polymer substrate. A material layer is deposited (e.g., sputter coated) on the surface to fill the ring feature. In certain embodiments, the material layer is a metal layer (e.g., nickel-chromium and gold) to provide adhesion and structural support. Photoresist is applied and the prior material layer is removed except for the portions protected by the photoresist. These portions form the re-entrant structure (e.g., hoodoo) caps. A mixed gas is used to reactive ion etch anisotropically to undercut the overhang portions of the hoodoo caps. A coating, such as parylene or another polymer, may optionally be applied to protect the structure and/or improve the omniphobicity of the structures. This method may be used to create a re-entrant structure where the stem and the cap are comprised of different materials. While the method may involve a polymer stem and a metal cap, a variety of material combinations may be used.

An alternative formation method uses microfabrication and molding. A molding material, such as a silicon wafer, is patterned with photoresist and etched to form a mold. Next, an infill material is deposited into the mold and cured. For example, the infill material may be a polymer. Any portion of the infill material protruding from the mold may be optionally etched to further shape the hoodoo cap. As compared with the above-described method, this method may be used to form a hoodoo structure of a single material.

One example method involves fabricating a master stamp. The master stamp can be fabricated, for example, by a subtractive method in which glass is etched by a femtosecond laser to form the re-entrant structure. The master stamp may also be formed by an additive method, e.g., using a 3D printer (e.g., two-photon lithography). Either a positive or negative master stamp may be fabricated with both approaches. The master stamp may further be replicated to fabricate robust stamps for further processing. The master stamp can either be directly replicated via electroforming to make multiple metal stamps (e.g., nickel stamps) or a polymer replica may be molded from the master stamp prior to electroforming. In either case, multiple metal stamps can be electroformed to create a repository for further embossing processes. The replica stamp is then used in an embossing process to make the final re-entrant structure. The stamp may be used in a hot embossing process, where a thermoplastic polymer is heated above its glass transition temperature and then embossed with the metal stamp. The polymer is then cooled back down before removing the metal stamp. A UV embossing process may also be used, where, for example, a thermoset polymer is used. The stamp is used to emboss the polymer and in this case, UV exposure cures the polymer in place before the stamp is removed.

In order to make through-holes for the pore structures in a continuous re-entrant structure (e.g., as shown in FIG. 5E), the stamp may have a long pin that punctures through the polymer film during the embossing process. A sacrificial layer may be included on top of the polymer film in this case during the embossing process.

A further method for forming hoodoo structures involves forming hoodoos with two different materials, such as polymers having different parameters. In certain embodiments, polymers with different glass transition temperatures may be used. First, a layer of a first polymer having a glass transition temperature is provided as a substrate, and a second polymer having a glass transition temperature lower than that of the first polymer is deposited (e.g., spin coated) on the surface of the first polymer. The second polymer layer may be thinner than that of the first polymer layer. For example, the second polymer layer be deposited at a thickness slightly higher than a desired hoodoo cap thickness. The composite polymer layer is patterned and etched to form discrete structures. Next, the structures are heated to allow the second polymer layer to partially flow, forming the cap overhang portions.

Sphere and inverse sphere structures may be achieved with known deposition and etching processes.

Once the re-entrant structures are formed (regardless of the re-entrant geometry), they need to be disposed on the porous material. In certain embodiments the re-entrant structures are formed directly on the porous material layer. In further embodiments, the re-entrant structures may be made from part of the porous material layer using techniques such as embossing, nano-imprinting, etching, etc. Any of the formation techniques described herein may be performed through roll-to-roll or roll-to-plate processing.

In still further embodiments, the re-entrant structures are coupled to the porous material layer. For example, the re-entrant structures may be transfer printed onto a layer of porous material. Certain re-entrant geometries, such as inverse spheres and continuous arrays of hoodoos, can be formed as one layer or entity, which makes them easier to manufacture and/or transfer print on a porous material substrate. These layers may appear, in a top-down view, as an array of discrete holes or inverse hoodoo structures.

Transfer printing is a known technique such that further details are not discussed. While transfer printing provides control over fabrication of the re-entrant structures, they must be adhered to the porous material layer. In certain embodiments, the re-entrant structures are applied directly to the porous material with a thermo-compression bond (e.g., using heat and force but no intermediate layer on the porous material). For example, a layer of re-entrant structures may be applied to the porous material and gaps (e.g., laser drilled holes) are provided between the stems of each structure to expose the underlying porous material. In other embodiments, a plasma bond is formed directly between the re-entrant structures and the porous material without an intermediate layer present. In alternative embodiments, the re-entrant structures may be adhered to the porous material with an intermediate layer such as a chemical bond (e.g., a layer applied by roll-on, spin-on, or dip-coating techniques) and/or an adhesive bond. When an intermediate layer is used, the porosity and compatibility with the underlying porous material is taken into consideration so as not to diminish the venting ability of the original porous material.

As described herein, patterning a surface of a porous material with a plurality of structures having re-entrant geometries can increase the repellency of the material. For example, the hydro and/or oleophobicity of a porous material may be increased with the inclusion of the plurality of re-entrant structures and without the use of additional chemical coatings.

ILLUSTRATIVE EMBODIMENTS

The technology described herein is defined in the claims. However, below is provided a non-exhaustive listing of non-limiting embodiments. Any one or more of the features of these embodiments may be combined with any one or more features of another example, embodiment, or aspect described herein.

Embodiment 1 is a filter material, comprising: a layer of porous material; and a plurality of structures disposed on a surface of the layer, wherein each of the structures has a re-entrant geometry.

Embodiment 2 is the filter material of any one of embodiments 1 and 3-23, wherein the plurality of structures is a plurality of ordered structures.

Embodiment 3 is the filter material of any one of embodiments 1-2 and 4-23, wherein the structures are discrete structures.

Embodiment 4 is the filter material of any one of embodiments 1-3 and 5-23, wherein the plurality of structures form a continuous re-entrant structure.

Embodiment 5 is the filter material of any one of embodiments 1-4 and 6-23, wherein each of the plurality of structures is spherical.

Embodiment 6 is the filter material of any one of embodiments 1-5 and 7-23, wherein each of the plurality of structures has an inverse sphere geometry.

Embodiment 7 is the filter material of any one of embodiments 1-6 and 8-23, wherein each of the plurality of structures has a hoodoo geometry.

Embodiment 8 is the filter material of embodiment 7, wherein the hoodoo geometry is determined based on a plurality of parameters including a stem radius in a range of 0.5-100 μm, a stem height in a range of 0-65 μm, an inner radius in a range of 0-200 μm, an outer radius in a range of 0-100 μm, a hoodoo angle in a range of −10-90 degrees, a cap height in a range of 0-10 µm, a hoodoo spacing in a range of 1 µm-1 mm, and a lattice angle in a range of 45-90 degrees.

Embodiment 9 is the filter material of embodiment 7, wherein the hoodoo geometry is determined based on a plurality of parameters including a stem radius in a range of 0.5-100 µm, a stem height in a range of 0-65 µm, an inner radius in a range of 0-100 µm, an outer radius in a range of 0-100 µm, a hoodoo angle in a range of −10-90 degrees, a cap height in a range of 0-10 µm, a hoodoo spacing in a range of 1-30 µm, and a lattice angle in a range of 45-90 degrees.

Embodiment 10 is the filter material of any one of embodiments 1-9 and 11-23, wherein the hoodoo geometry includes a stem portion and a cap portion and the cap portions of adjacent structures are attached together.

Embodiment 11 is the filter material of any one of embodiments 1-10 and 12-23, wherein the plurality of structures is formed on the layer.

Embodiment 12 is the filter material of any one of embodiments 1-11 and 13-23, wherein the plurality of structures is formed of a material different from the porous material.

Embodiment 13 is the filter material of any one of embodiments 1-12 and 14-23, wherein the plurality of structures is formed on a second layer coupled to the layer of porous material.

Embodiment 14 is the filter material of embodiment 13, wherein the second layer and the first layer comprise the same material.

Embodiment 15 is the filter material of embodiment 13, wherein the second layer is a material different from that of the first layer.

Embodiment 16 is the filter material of any one of embodiments 1-15 and 17-23, wherein the porous material is a membrane.

Embodiment 17 is the filter material of embodiment 16, wherein the membrane comprises one of polypropylene, polyethylene, polyester, polyethersulfone, polysulfone, expanded polytetrafluoroethylene, polyvinylidene fluoride, polyamide, polyacrylonitrile, polycarbonate, cellulose acetate, and nylon.

Embodiment 18 is the filter material of any one of embodiments 1-17 and 19-23, wherein the plurality of structures is disposed on opposing surfaces of the layer.

Embodiment 19 is the filter material of any one of embodiments 1-18 and 20-23, wherein the re-entrant geometry is a double re-entrant geometry.

Embodiment 20 is the filter material of any one of embodiments 1-19 and 21-23, wherein the re-entrant geometry comprises a substantially flat outer surface.

Embodiment 21 is the filter material of any one of embodiments 2-20 and 22-23, wherein each of the plurality of ordered structures is disposed in an array having first dimension and a second dimension disposed at an angle relative to the first dimension, and the array has a lattice pitch in the first dimension and in the second dimension. The edge spacing between each structure in the array may be determined based on an expected contaminant.

Embodiment 22 is the filter material of embodiment 21, wherein lattice pitch between structures in the first dimension of the array is different from lattice pitch between structures in the second dimension of the array.

Embodiment 23 is the filter material of any one of embodiments 1-22, wherein the outer surface of the layer of porous material further comprises a coating that increases oleophobicity of the layer.

Embodiment 24 is a filter element comprising the filter material of any one of embodiments 1-23.

Embodiment 25 is a filter material comprising a layer of porous material and a plurality of re-entrant (e.g., hoodoo) structures disposed on a surface of the layer. Each of the re-entrant (e.g., hoodoo) structures comprises a stem and a cap and the caps of adjacent structures are attached to form a plurality of pores, where each pore is disposed between adjacent hoodoo structures.

Embodiment 26 is the filter material of any one of embodiments 25 and 27-36, wherein the plurality of structures is formed on the layer.

Embodiment 27 is the filter material of any one of embodiments 25-26 and 28-36, wherein the plurality of structures is formed of a material different from the porous material.

Embodiment 28 is the filter material of any one of embodiments 25-27 and 28-36, wherein the plurality of structures comprises a second layer coupled to the layer of porous material.

Embodiment 29 is the filter material of embodiment 28, wherein the second layer and the first layer comprise the same material.

Embodiment 30 is the filter material of embodiment 28, wherein the second layer is a material different from that of the first layer.

Embodiment 31 is the filter material of any one of embodiments 25-30 and 32-36, wherein the porous material is a membrane.

Embodiment 32 is the filter material of embodiment 31, wherein the membrane comprises one of polypropylene, polyethylene, polyester, polyethersulfone, polysulfone, expanded polytetrafluoroethylene, polyvinylidene fluoride, polyamide, polyacrylonitrile, polycarbonate, cellulose acetate, and nylon.

Embodiment 33 is the filter material of any one of embodiments 25-32 and 34-36, wherein the plurality of structures is disposed on opposing surfaces of the layer.

Embodiment 34 is the filter material of any one of embodiments 25-33 and 35-36, wherein the re-entrant structures form a substantially flat outer surface.

Embodiment 35 is the filter material of any one of embodiments 25-34 and 36, wherein each of the plurality of structures is disposed in an array having a first dimension and a second dimension and a first lattice pitch between structures in the first dimension of the array is different from a second lattice pitch between structures in the second dimension of the array.

Embodiment 36 is the filter material of any one of embodiments 25-35, wherein the outer surface of the layer of porous material further comprises a coating that increases oleophobicity of the layer.

Embodiment 37 is a filter element comprising the filter material of any one of embodiments 25-36.

Embodiment 38 is a filter material, comprising: a layer of porous material; and a first plurality of structures disposed on a surface of the layer, wherein each of the structures has a re-entrant geometry, at least some of the structures have re-entrant geometry along two orthogonal planes, and optionally at least some of the first plurality of structures comprises re-entrant geometries along three orthogonal planes.

Embodiment 39 is the filter material of any one of embodiments 38 and 40-64, wherein the first plurality of structures comprising re-entrant geometries along three orthogonal planes comprise a first re-entrant geometry in a plane substantially perpendicular to the layer of porous material and a second re-entrant geometry in a plane substantially parallel to the layer of porous material.

Embodiment 40 is the filter material of any one of embodiments 38-39 and 41-64, wherein the first plurality of structures comprising re-entrant geometries along three orthogonal planes comprise a webbed stem comprising a plurality of connected webs and a rib extending from an edge of each web.

Embodiment 41 is the filter material of any one of embodiments 38-41 and 42-64, wherein the lobes define a re-entrant geometry in a plane parallel to the surface of the substrate.

Embodiment 42 the filter material of embodiment 41, wherein each of the ribs comprises similar second re-entrant geometry.

Embodiment 43 is the filter material of any one of embodiments 40-42, wherein the ribs extending parallel to a longitudinal axis of the structure.

Embodiment 44 is the filter material of embodiment 43, wherein the ribs define a convex curve away from the stem.

Embodiment 45 is the filter material of embodiment 43, wherein the ribs define a concave curve toward the stem.

Embodiment 46 is the filter material of any one of embodiments 38-45 and 47-64, wherein the subset of structures are discrete structures.

Embodiment 47 is the filter material of any one of embodiments 38-46 and 48-64, wherein the subset of structures form a continuous re-entrant structure.

Embodiment 48 is the filter material of any one of embodiments 38-47 and 49-64, wherein the subset of structures is spherical.

Embodiment 49 is the filter material of any one of embodiments 38-48 and 50-64, wherein the subset of structures has an inverse sphere geometry.

Embodiment 50 is the filter material of any one of embodiments 38-49 and 51-64, wherein the subset of structures has a hoodoo geometry.

Embodiment 51 is the filter material of any one of embodiments 38-50 and 52-64, wherein the structures in the subset are arranged in a pattern configured to control movement of a breakthrough fluid.

Embodiment 52 is the filter material of embodiment 51, wherein the pattern forms a circumference of a shape.

Embodiment 53 is the filter material of embodiment 52, wherein structures positioned within the circumference are not part of the subset of structures.

Embodiment 54 is the filter material of any one of embodiments 38-53 and 55-64, further comprising a second plurality of structures having re-entrant geometries along three orthogonal planes, wherein the re-entrant structures of the second plurality are different from the structures of the first plurality.

Embodiment 55 is the filter material of embodiment 54, wherein structures of the first plurality comprise a first number of webs and structures of the second plurality comprise a second number of webs.

Embodiment 56 is the filter material of embodiment 54, wherein structures of the first plurality comprise a cap and structures of the second plurality do not comprise a cap.

Embodiment 57 is the filter material of embodiment 54, wherein structures having a re-entrant geometry along three orthogonal planes are disposed proximate structures having re-entrant geometry along two orthogonal planes to control movement of a breakthrough fluid.

Embodiment 58 is the filter material of any one of embodiments 38-57, wherein the structures of the second plurality have an average diameter smaller than an average diameter of the structures of the first plurality.

Embodiment 59 is a filter element comprising the filter material of any one of embodiments 38-58.

Embodiment 60 is the filter material of any one of embodiments 1-37 and 59, wherein the plurality of structures form a continuous structure defining a second layer having a first surface and a second surface opposite of the first surface, the second layer comprising a plurality of pores formed between structures of the plurality of structures, and wherein the second surface comprises one or more grooves positioned between the pores.

Embodiment 61 is the filter material of embodiment 60, wherein the one or more grooves form continuous shapes, each continuous shape surrounding one or more pores.

Embodiment 62 is a liquid-phobic material comprising: a first layer comprising: a lattice with a first surface and a second surface opposite of the first surface; a plurality of pores extending from the first side to the second surface, each pore comprising a re-entrant structure adjacent the first surface rendering the first surface liquid phobic. The first layer may further optionally comprise a plurality of drainage structures disposed along the second surface.

Embodiment 63 is the liquid-phobic material of embodiment 62, wherein the plurality of drainage structures comprise protrusions extending from the second surface.

Embodiment 64 is the liquid-phobic material of embodiment 62 or 63, wherein the plurality of drainage structures comprise grooves in the second surface.

Embodiment 65 is the liquid-phobic material of embodiment 64, wherein the grooves comprise continuous shapes, each continuous shape surrounding one or more pores.

Embodiment 66 is the liquid-phobic material of any one of embodiments 62 to 65, further comprising a second layer disposed along the second surface of the first layer.

Embodiment 67 is the liquid-phobic material of embodiment 66, wherein the second layer comprises filtration media.

EXAMPLES

Example 1

Predicted values of breakthrough (wetting) pressure are calculated using the equations set forth above. In Example 1, the edge spacing is held constant for hoodoos having various parameters, identified as Geometries 1-9 in FIG. 8. The values in FIG. 8 are provided for a liquid with a surface tension of 26 mN/m and a contact angle of 44 degrees.

The stem height and cap height values are sectioned off in FIG. 8 to indicate that they have no effect on breakthrough pressure, as indicated by Geometries 2 and 3.

Geometries 4-9 iteratively change one feature dimension at a time (indicated by the shaded values), and the resulting breakthrough pressure is shown at the bottom of FIG. 8. The largest effects on breakthrough pressure are observed in Geometries 5-9 and are discussed in Example 2.

Example 2

Predicted values of breakthrough (wetting) pressure are calculated using the equations set forth above. In Example 2, the edge spacing is held constant for hoodoos having the various parameters, identified as Geometries 1-9 in FIG. 8. The values in FIG. 8 are provided for a liquid with a surface tension of 26 mN/m and a contact angle of 44 degrees.

Figure 9:
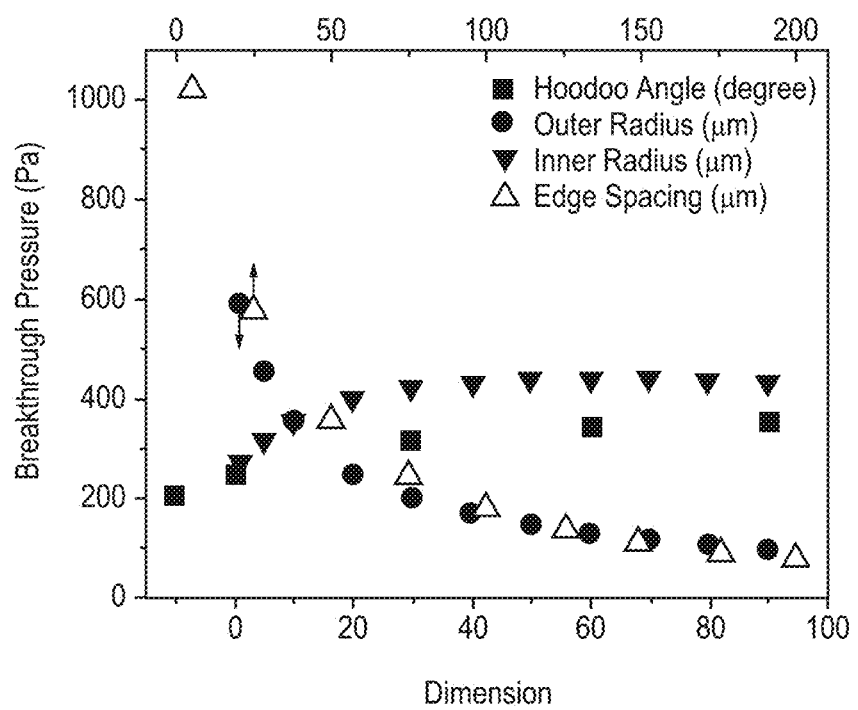
FIG. 9 is a graph illustrating breakthrough pressure as a function of various hoodoo dimensions, in accordance with certain embodiments.

FIG. 9 further analyzes the parameters that change the breakthrough pressure the most. As seen in FIG. 9, the hoodoo angle increases breakthrough pressure with increasing hoodoo angle. A decreasing outer radius increases breakthrough pressure by increasing $F_{CL}$. A decreased edge spacing increases breakthrough pressure by decreasing A (the projected surface area of the liquid). An increasing inner radius increases breakthrough pressure by changing the pinning location of the contact line, affecting both $F_{CL}$ and A.

Examples 3-5 test breakthrough pressures of 3D printed structures using a stereolithography (SLA) printer (Form3B, Formlabs, Somerville, MA, USA).

Example 3

Re-entrant structures (i.e., hoodoos) were 3D printed as described above with the varying tip radius and spacing set forth in Table 1 below. Breakthrough pressure was measured by gluing a syringe to the 3D printed structure and continually adding water into the syringe until breakthrough was observed. The breakthrough pressure was calculated from the head pressure of water before breakthrough. The experimental breakthrough pressures were compared to predicted values using the equations above.

TABLE 1

| Tip Type | Tip Radius (mm) | Spacing (mm) | Measured Breakthrough Pressure (Pa) | Predicted Breakthrough Pressure (Pa) |
|---|---|---|---|---|
| Smooth | 0.15 | 0.8 | 176 ± 3 | 249 |
|  | 0.15 | 1.3 | 135 ± 17 | 170 |
| Sharp | 0.070 | 0.8 | 218 ± 9 | 304 |
|  | 0.070 | 1.2 | 134 ± 5 | 205 |

Figure 10:
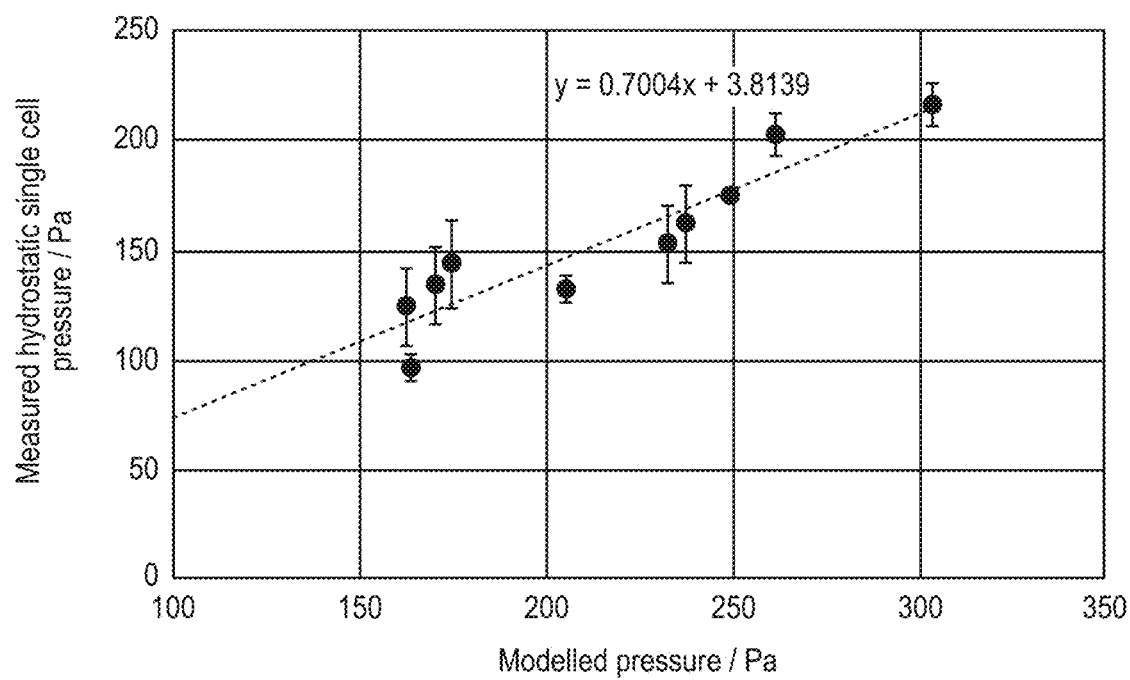
FIG. 10 is a graph illustrating measured breakthrough pressure compared with modeled breakthrough pressure, in accordance with certain embodiments.

Measured breakthrough pressures are consistently about 70% of the predicted breakthrough pressures as seen in FIG. 10. Table 1 shows that a smaller spacing results in an increased breakthrough pressure, and a sharper tip (i.e., decreased outer radius) results in an increased breakthrough pressure as predicted.

Example 4

Re-entrant structures (i.e., hoodoos) were 3D printed as described above with the varying tip radius and spacing set forth in Table 2 below. Breakthrough pressure was measured with a single droplet of water. The droplet was pushed by a hydrophobic plate into the re-entrant structure. A balance recorded the change in mass as the droplet was pushed into the re-entrant structure and was converted to a breakthrough pressure.

TABLE 2

| Tip Type | Tip Radius (mm) | Spacing (mm) | Measured Breakthrough Pressure (Pa) | Predicted Breakthrough Pressure (Pa) |
|---|---|---|---|---|
| Smooth | 0.15 | 1.5 | 65 ± 19 | 71 |
| Sharp | 0.070 | 1.1 | 97 ± 23 | 100 |

Measured and predicted breakthrough pressures are relatively close at low breakthrough pressures, as shown in Table 2. This method can produce artificially high breakthrough pressures from the droplet moving laterally across the hoodoo instead of downward into the structure and therefore should be used with care for structures with high breakthrough pressures. This may also be the reason for the large standard deviation in Table 2.

Example 5

Figure 24A:
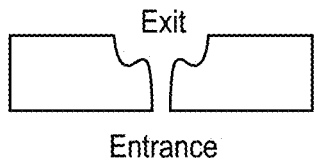
FIG. 24A is a schematic cross-sectional side view of a single pore of the tested material of Example 5.
Figure 24B:
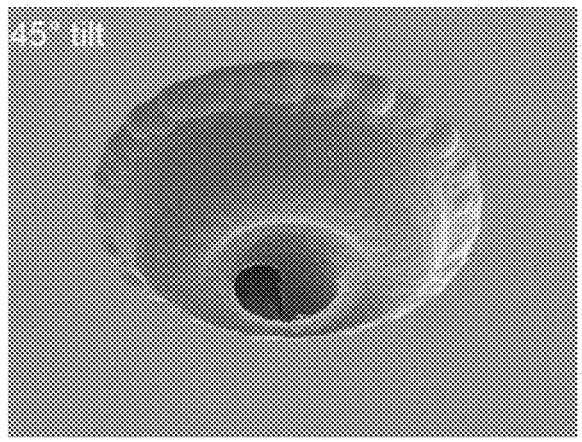
FIGS. 24B and 24C are microscopic images of a single pore of the tested material of FIG. 24A.
Figure 24C:
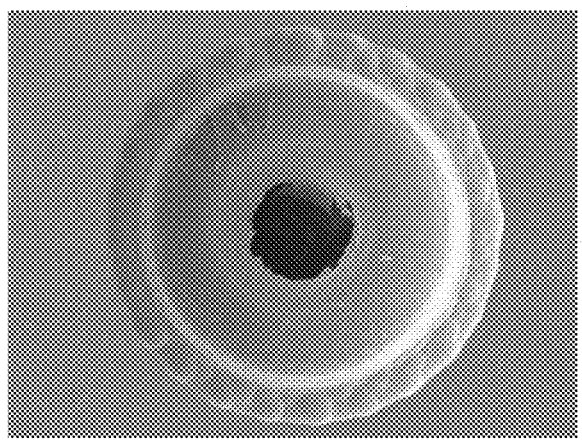

Re-entrant structures were replicated at a microscale and designed to repel liquids with low surface tensions (>20 mN/m) without the use of any chemical coating. Re-entrant structures (hoodoos) were made through a molding and hot embossing process described below. FIG. 24A is a schematic side view of one of the pores of the printed structures with re-entrant sides, turned upside down so that the exit side is up. FIGS. 24B and 24C are microscopic images of a single pore with re-entrant sides in the orientation shown from FIG. 24A (i.e., exit side up).

A master stamp was fabricated by etching glass with a femtosecond laser to form the re-entrant structure (hoodoo). The master stamp was designed with a tall pin structure that punctures a through-hole in the resulting hot embossed film. The master stamp was then directly replicated via electroforming to make a nickel stamp. A 200 nm gold layer was sputter coated onto the glass master prior to electroforming to ensure ease of demolding. The nickel stamp was then used in a hot embossing process to make the final re-entrant structure. A polymethyl methacrylate (PMMA) film (50 μm thick), available as product ME30-FM-000150 from Goodfellow Corporation in Pittsburgh, PA, was used in the hot embossing process with a silicone layer on top acting as a sacrificial layer. The tall pin structures puncture through the 50 μm PMMA film into the sacrificial silicone layer to create the through-holes. The PMMA film was embossed at a temperature of 135° C. and a force of 2 kN for 5 minutes. The PMMA film was cooled down to below 100° C. before the force was released.

Example 6

Re-entrant structures (hoodoos) were 3D printed as described above. Single re-entrant structures were printed with either 500 μm or 1000 μm pore diameters. Exit structure channel widths were either 500 μm or 1000 μm and surrounded every pore. Continuous lattices with pores having re-entrant sides were prepare with and without exit structures (drains).

Water with 0.5% sodium dodecyl sulfate (SDS) was used as the test liquid. The test liquid was pressurized with a syringe to cause a breakthrough while imaging the droplet propagation. Tests were performed with the pressurized liquid volume either below (FIG. 25) or above (FIG. 28) the re-entrant structure array. FIGS. 26A-27C and 29A-29E are images captured from videos taken during the experiment.

Figure 25:
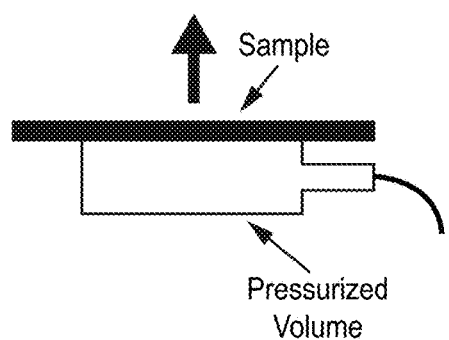
FIG. 25 is a schematic side view of a sample test arrangement used in Example 6, in accordance with certain embodiments.
Figures 26A, 26B, 26C:
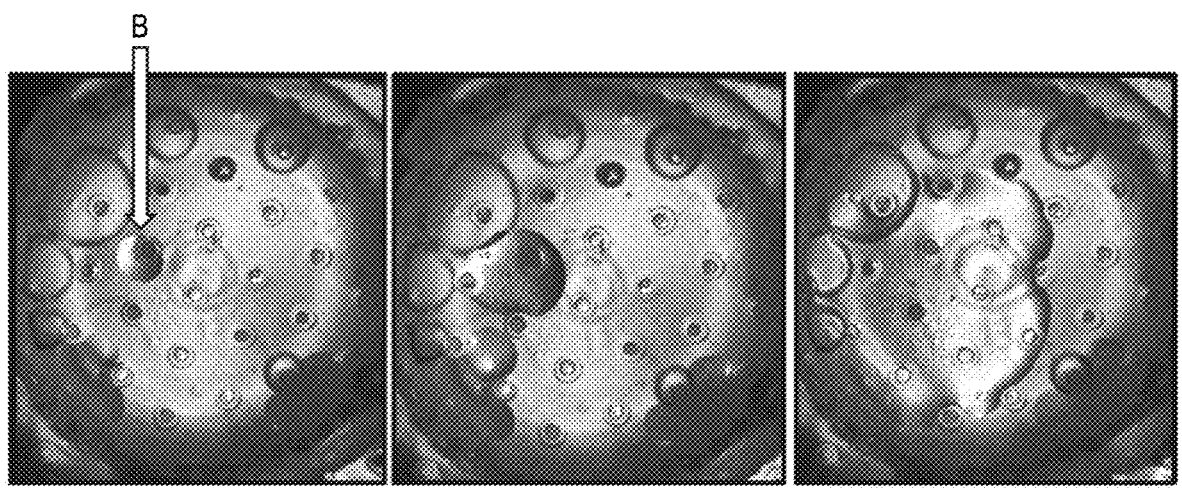
FIGS. 26A-26C are microscopic images of a sample with a continuous lattice with re-entrant hoodoo structures, being tested with the sample test arrangement of FIG. 25.

FIGS. 26A-26C show a re-entrant structure array having pore size of 1000 μm with no exit structures, tested with the pressurized volume applied from below the sample (as shown in FIG. 25). The liquid breaks through at point B indicated by the arrow in FIG. 26A, and propagates across the array, causing widespread failure by wetting out pores across the array.

Figures 27A, 27B, 27C:
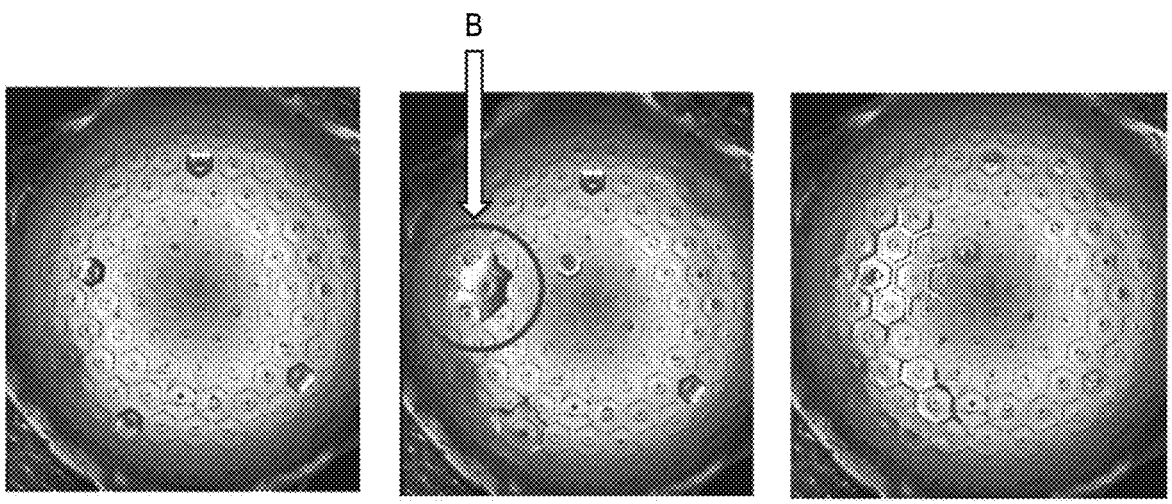
FIGS. 27A-27C are microscopic images of a sample with a continuous lattice with re-entrant hoodoo structures and drainage channels, being tested with the sample test arrangement of FIG. 25.

FIGS. 27A-27C show a re-entrant structure array with 1000 μm exit structure channels surrounding every pore, pore sizes of 500 μm and 1000 μm with the 1000 μm pores acting as a "defect," tested with the pressurized volume applied from below the sample. The liquid breaks through at point B indicated by the arrow in FIG. 27B, and fills the channel volume, propagating around the pores and preventing widespread failure.

FIG. 28 shows a test set up where a re-entrant structure array with 1000 µm exit structure channels surrounding every pore, pore sizes of 500 µm and 1000 µm with the 1000 µm pores acting as a "defect," tested with the pressurized volume applied from above the sample. In some cases, a breakthrough occurs (point B indicated by the arrow in FIG. 29A), and in some cases the liquid continues to drip off the sample as shown in point B indicated by the arrow in FIG. 29A. In other cases, the liquid breaks through a single pore and fills some volume of the exit structure channels as shown, for example, in point D in FIGS. 29D and 29E. Exit structures in this case prevented widespread failure of the array. Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A filter material comprising:
    a first layer of porous material, the first layer comprising a single layer of material comprising:
        a plurality of re-entrant structures, each of the re-entrant structures comprising a stem and a cap, and adjacent structures being connected to each other by their caps and stems, forming a continuous lattice of connected re-entrant structures; and
        a plurality of pores formed by or between the re-entrant structures,
            wherein the pores are through-holes extending through the layer of porous material.

2. The filter material of claim 1, wherein the porous material is a membrane.

3. The filter material of claim 1, further comprising a second plurality of structures disposed on an opposing surface of the first layer.

4. The filter material of claim 1, wherein each of the plurality of structures is disposed in an array having a first dimension and a second dimension, and wherein a first lattice pitch between structures in the first dimension of the array is different from a second lattice pitch between structures in the second dimension of the array.

5. The filter material of claim 1, wherein a surface of the first layer comprises one or more grooves positioned between the pores.

6. The filter material of claim 1, wherein the pores have a pore diameter of 1 µm to 100 µm.

7. The filter material of claim 1, wherein the filter material comprises venting media.

8. The filter material of claim 2, wherein the membrane comprises one or more of polypropylene, polyethylene, polyester, polyethersulfone, polysulfone, expanded polytetrafluoroethylene, polyvinylidene fluoride, polyamide, polyacrylonitrile, polycarbonate, cellulose acetate, and nylon.

9. The filter material of claim 1, further comprising a second layer disposed along a surface of the first layer of porous material, wherein the second layer comprises filtration media.

10. A filter element comprising the filter material of claim 1.

* * * * *